(12) United States Patent
Zhang et al.

(10) Patent No.: US 11,511,842 B2
(45) Date of Patent: Nov. 29, 2022

(54) MINIATURE AUTONOMOUS ROBOTIC BLIMP

(71) Applicant: Georgia Tech Research Corporation, Atlanta, GA (US)

(72) Inventors: Fumin Zhang, Alpharetta, GA (US); Qiuyang Tao, Atlanta, GA (US); Tun Jian Tan, Atlanta, GA (US); Phillip Sung Tse Cheng, Duluth, GA (US); Sungjin Cho, Atlanta, GA (US); Vivek Mishra, Atlanta, GA (US); Jesse P. Varnell, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 857 days.

(21) Appl. No.: 16/280,579

(22) Filed: Feb. 20, 2019

(65) Prior Publication Data
US 2019/0258257 A1 Aug. 22, 2019

Related U.S. Application Data

(60) Provisional application No. 62/632,624, filed on Feb. 20, 2018.

(51) Int. Cl.
*B64B 1/06* (2006.01)
*G05D 1/02* (2020.01)
(Continued)

(52) U.S. Cl.
CPC .............. *B64B 1/06* (2013.01); *B64B 1/40* (2013.01); *B64D 47/06* (2013.01); *B64D 47/08* (2013.01);
(Continued)

(58) Field of Classification Search
CPC ......... B64B 1/40; B64B 2201/00; B64B 1/00; B64B 1/06; B64B 1/24; B64B 1/26;
(Continued)

(56) References Cited

U.S. PATENT DOCUMENTS 10,168,700 B2 * 1/2019 Gordon ................ B64C 39/024
10,267,949 B2 * 4/2019 Narabu ................ B64C 39/024
(Continued)

OTHER PUBLICATIONS

Gonzalez et al.: "Developing a Low-Cost Autonomous Indoor Blimp"; Jan. 2009; Journal of Physical Agents; vol. 3., No. 1.
(Continued)

*Primary Examiner* — Benjamin P Lee
(74) *Attorney, Agent, or Firm* — Bryan W. Bockhop; Bockhop Intellectual Property Law, LLC

(57) ABSTRACT

A blimp includes a circular disk-shaped envelope filled with a lighter-than-air gas. A gondola is affixed to an underside of the envelope and is disposed at a region directly below a center point of the circle defined by the intersection of the envelope and the horizontal plane. The gondola includes: a horizontally-disposed elongated circuit board that functions as a structural member of the gondola; and a vertical member extending upwardly from the circuit board and having a top that is attached to the underside of the envelope. A thrusting mechanism is affixed to the gondola and is configured to generate thrust. An electronics suite is disposed on and electrically coupled to the circuit board and includes a blimp processor configured to generate control signals that control the thrusting mechanism. A battery is affixed to the gondola and provides power to the electronics suit and the thrusting mechanism.

21 Claims, 7 Drawing Sheets

(51) Int. Cl.
*B64B 1/40* (2006.01)
*B64D 47/08* (2006.01)
*B64D 47/06* (2006.01)
*G06V 40/12* (2022.01)
*B64C 39/02* (2006.01)

(52) U.S. Cl.
CPC ....... *G05D 1/0202* (2013.01); *G06V 40/1365* (2022.01); *B64C 39/024* (2013.01); *B64C 2201/022* (2013.01); *B64C 2201/141* (2013.01); *B64C 2201/162* (2013.01)

(58) Field of Classification Search
CPC ........... B64B 1/30; B64B 47/00; B64B 47/06; G05D 1/0202; B64C 2201/022; B64C 2201/141
See application file for complete search history.

(56) References Cited

U.S. PATENT DOCUMENTS

| | | | | |
|---|---|---|---|---|
| 10,486,788 | B2* | 11/2019 | Piette | H04N 5/232 |
| 10,780,990 | B2* | 9/2020 | Muramatsu | H04N 9/3147 |
| 10,800,505 | B1* | 10/2020 | Edsinger | H04N 7/15 |
| 2003/0025034 | A1* | 2/2003 | Akahori | G08G 5/0013 244/96 |
| 2011/0292348 | A1* | 12/2011 | Tobita | B64B 1/28 353/28 |
| 2015/0280811 | A1* | 10/2015 | Singhal | H04B 7/18504 455/431 |
| 2016/0076892 | A1* | 3/2016 | Zhou | B64D 47/08 701/3 |
| 2017/0122736 | A1* | 5/2017 | Dold | B64B 1/40 |
| 2017/0235308 | A1* | 8/2017 | Gordon | B64C 39/024 701/2 |
| 2017/0276833 | A1* | 9/2017 | Narabu | B64D 47/08 |
| 2018/0101173 | A1* | 4/2018 | Banerjee | H04N 5/23248 |
| 2018/0304981 | A1* | 10/2018 | Piette | B64B 1/22 |
| 2018/0327070 | A1* | 11/2018 | Rahnama | H04B 1/3888 |
| 2020/0027357 | A1* | 1/2020 | Zhou | G08G 5/0086 |
| 2021/0129983 | A1* | 5/2021 | Ratti | B64B 1/44 |

OTHER PUBLICATIONS

Bermudez I Badia et al.: "A Biologically Based Flight Control System for a Blimp-based UAV"; Apr. 2005; Proceedings of the 2005 IEEE International Conference of Robotics and Automation, Barcelona, Spain.

Takaya et al.: "Motion Control in Three Dimensional Round System of Blimp Robot"; 2006; SICE-ICASE International Joint Conference.

Takaya et al.: "PID landing orbit motion controller for an indoor blimp robot"; Feb. 4, 2005; Artif Life Robotics.

Kawamura et al.: "Learning landing control of an indoor blimp robot for self-energy recharging"; Jan. 25, 2007; Artif Life Robotics.

Kawamura et al.: "Cooperative control of multiple neural networks for an indoor blimp robot"; Jan. 31, 2008; Artif Life Robotics.

Mahn et al.: "A Behaviour-Based Navigation System for an Autonomous Indoor Blimp"; 2006; IFAC.

Furukawa et al.: "Wind-Disturbance-Based Control Approach for Blimp Robots"; 2014; Electronics and Communications in Japan; vol. 97, No. 2.

Wan et al.: "Design and Autonomous Control of a Solar-Power Blimp"; Jan. 8, 2018; AIAA SciTech Forum; 2018 AIAA Guidance, Navigation, and Control Conference.

Wang et al.: "Altitude Control for an Indoor Blimp Robot"; 2017; IFAC PapersOnLine 50-1.

Zufferey et al.: "Flying over the reality gap: From simulated to real indoor airships"; Sep. 5, 2006; Auton Robot; 21:243-254.

Cho et al.: "Autopilot Design for a Class of Miniature Autonomous Blimps"; Aug. 27, 2017; 2017 IEEE Conference on Control Technology and Applications (CCTA).

Palossi et al.: "Self-Sustainability in Nano Unmanned Aerial Vehicles: A Blimp Case Study"; 2017; ACM.

Ashraf et al.: "Dynamic Modeling of the Airship Using Analytical Aerodynamic Model"; 2009; IEEE; International Conference on Emerging Technologies.

Srisamosorn et al.: Design of Face Tracking System Using Fixed 360-Degree Cameras and Flying Blimp for Health Care Evaluation; 2016; ICServ 2016.

Kale et al.: "A generic methodology for determination of drag coefficient of an aerostat envelope using CFD"; Sep. 26, 2005; AIAA 5th Aviation, Technology, Integration, and Operations Conference (ATIO).

Varella Gomes et al.: "Airship Dynamic Modeling for Autonomous Operation"; May 1998; IEEE.

Shan: "Dynamic Modeling and Vision-Based Control for Indoor Airship"; Aug. 9, 2009; IEEE.

Kadota et al.: "Vision-Based Positioning System for Indoor Blimp Robot"; Jul. 5, 2004; IAV2004—Reprints.

Liu et al.: "Control of autonomous airship"; 2009; IEEE; Proceedings of the 2009 IEEE International Conference on Robotics and Biomimetics.

Galvis Mendoza et al.: "Design, implementation and control of a UAV blimp for photography"; Aug. 2016; Int'l. Journal of Engineering Research & Science; vol. 2; Iss. 8.

* cited by examiner

MINIATURE AUTONOMOUS ROBOTIC BLIMP

CROSS-REFERENCE TO RELATED APPLICATION(S)

This application claims the benefit of U.S. Provisional Patent Application Ser. No. 62/632,624, filed Feb. 20, 2018, the entirety of which is hereby incorporated herein by reference.

STATEMENT OF GOVERNMENT SUPPORT

This invention was made with government support under grant No. N00014-14-1-0635, awarded by the Office of Naval Research. The government has certain rights in the invention.

This invention was made with government support under grant No. N00014-16-1-2667, awarded by the Office of Naval Research. The government has certain rights in the invention.

This invention was made with government support under grant No. 1559476, awarded by the National Science Foundation. The government has certain rights in the invention.

This invention was made with government support under grant No. N00173-19-P-1412, awarded by the Naval Research Lab. The government has certain rights in the invention.

This invention was made with government support under grant No. U.S. Pat. No. 1,319,874, awarded by the National Science Foundation. The government has certain rights in the invention.

This invention was made with government support under grant No. CMMI-1436284, awarded by the National Science Foundation. The government has certain rights in the invention.

BACKGROUND OF THE INVENTION

1. Field of the Invention

The present invention relates to robots and, more specifically, to a robotic blimp.

2. Description of the Related Art

Indoor aerial robots are gaining increasing attention owing to their promising applications including surveillance, building exploration, and search and rescue. In addition, human-robot interaction with indoor airborne robots is an area of increasing interest. However, most existing indoor aerial platforms such as quadcopters, have fast-spinning propellers which may cause safety concerns in human-occupied indoor environments. Also, these platforms usually have limited flight endurance, which limits their applications. For instance, the flight time of a typical small-sized quadcopter is usually less than 20 minutes.

Lighter than air robots (LTARs) keep themselves aloft without the need for consistent motor action. Hence, LTARs are the most power efficient unmanned aerial systems, and their endurance can be several orders of magnitude greater than that of a heavier-than-air craft.

The extended flight endurance makes LTARs well-suited to many applications that require sustained airborne presence. However, size of LTARs is usually at the scale of a couple meters, such that it can obtain sufficient amount of buoyancy. As a consequence, most LTARs are designed for outdoor applications instead of indoor purposes.

Therefore, there is a need for a safer robot with longer airborne endurance.

SUMMARY OF THE INVENTION

The disadvantages of the prior art are overcome by the present invention which, in one aspect, is a blimp that includes a circular disk-shaped envelope filled with a lighter-than-air gas. The envelope having a circular cross section when intersecting a horizontal plane. A gondola is affixed to an underside of the envelope and is disposed at a region directly below a center point of a circle defined by the intersection of the envelope and a horizontal plane. The gondola includes: a horizontally-disposed elongated circuit board that functions as a structural member of the gondola; and a vertical member extending upwardly from the circuit board and having a top that is attached to the underside of the envelope. A thrusting mechanism is affixed to the gondola and is configured to generate thrust. An electronics suite is disposed on and electrically coupled to the circuit board and includes a blimp processor configured to generate control signals that control the thrusting mechanism. A battery is affixed to the gondola and provides power to the electronics suit and the thrusting mechanism.

In another aspect, the invention is an autonomous blimp that includes a circular disk-shaped envelope filled with a lighter-than-air gas. The envelope having a circular cross section when intersecting a horizontal plane. A gondola is affixed to an underside of the envelope and is disposed at a region directly below a center point of the envelope. The gondola includes: a horizontally-disposed elongated circuit board that functions as a structural member of the gondola; a vertical member extending upwardly from the circuit board and having a top that is attached to the underside of the envelope; two spaced apart forward horizontal thrusters, each attached at opposite ends of the circuit board and each controlled by the control circuitry and each configured to generate thrust along an X axis relative to the blimp, each of the forward horizontal thrusters electrically coupled to the circuit board; two spaced apart vertical thrusters, each coupled to the vertical member and each controlled by the control circuitry and configured to generate thrust along a Z axis that is orthogonal to the X axis; and one side thruster coupled to the vertical member and configured to generate thrust along a Y axis that is orthogonal to the X axis and the Y axis. An electronics suite is disposed on and electrically coupled to the circuit board and including a blimp processor configured to generate control signals that control rotational speed of the horizontal thrusters, the vertical thrusters and the side thruster. A battery is affixed to the gondola and provides power to the electronics suit, the horizontal thrusters, the vertical thrusters and the side thruster. A means for detecting movement of at least one of the facial features of the specific user and generates a control signal that causes the blimp to follow the user so as to move to a predetermined distance and orientation from the at least one of the facial features of the specific user.

In yet another aspect, the invention is an autonomous robotic blimp that includes a circular disk-shaped envelope filled with a lighter-than-air gas. A gondola is affixed to an underside of the envelope and is disposed at a region directly below a center point of the envelope. A five-thruster thrusting mechanism affixed to the gondola and configured to generate thrust. An electronics suite is disposed on the gondola. The electronics suite includes a monocular camera disposed on the gondola and configured to capture video from a region in front of the blimp; a blimp processor that is responsive to the monocular camera and that generates a thrusting mechanism control signal based on the video captured by the monocular camera. A battery is affixed to the gondola and configured to provide power to the electronics suit, the horizontal thrusters, the vertical thrusters and the side thruster.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
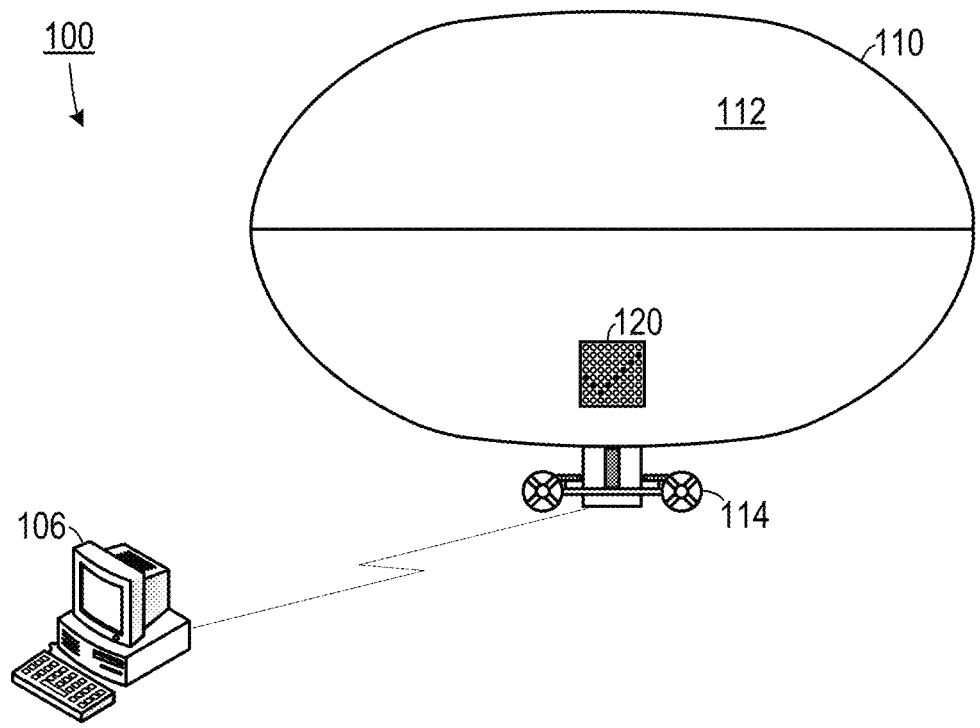
FIG. 1 is a schematic diagram of a blimp system.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Lighter than air robots (LTARs) keep themselves aloft without the need for consistent motor action. Hence, LTARs are the most power efficient unmanned aerial systems, and their endurance can be several orders of magnitude greater than that of a heavier-than-air craft.

The extended flight endurance makes LTARs well-suited to many applications that require sustained airborne presence. However, size of LTARs is usually at the scale of a couple meters, such that it can obtain sufficient amount of buoyancy. As a consequence, most LTARs are designed for outdoor applications instead of indoor purposes.

As shown in FIG. 1, one embodiment of a robotic blimp system 100, includes a blimp 110 in communication with a ground station 106 (which can include, for example, a desktop computer, a laptop computer, a tablet or even a smart phone, and which communicates with a wireless chipset). The blimp 110 includes a disk-shaped envelope 112 filled with a lighter-than-air gas, such as helium. The blimp 110 has a circular intersection with a central horizontal plane 10. (It is understood that other gases may be employed, depending on the specific application and environment.) A gondola 114 is affixed to a central location on the underside of the envelope 112. The envelope 112 may be made, for example, of Mylar or any other lightweight film. The envelope 112 intersects a horizontal plane at its middle substantially in a circle. A display element 120 (such as a matrix of LED's) can be affixed to the envelope 112 or the gondola 114 to provide feedback to a user.

Figure 2:
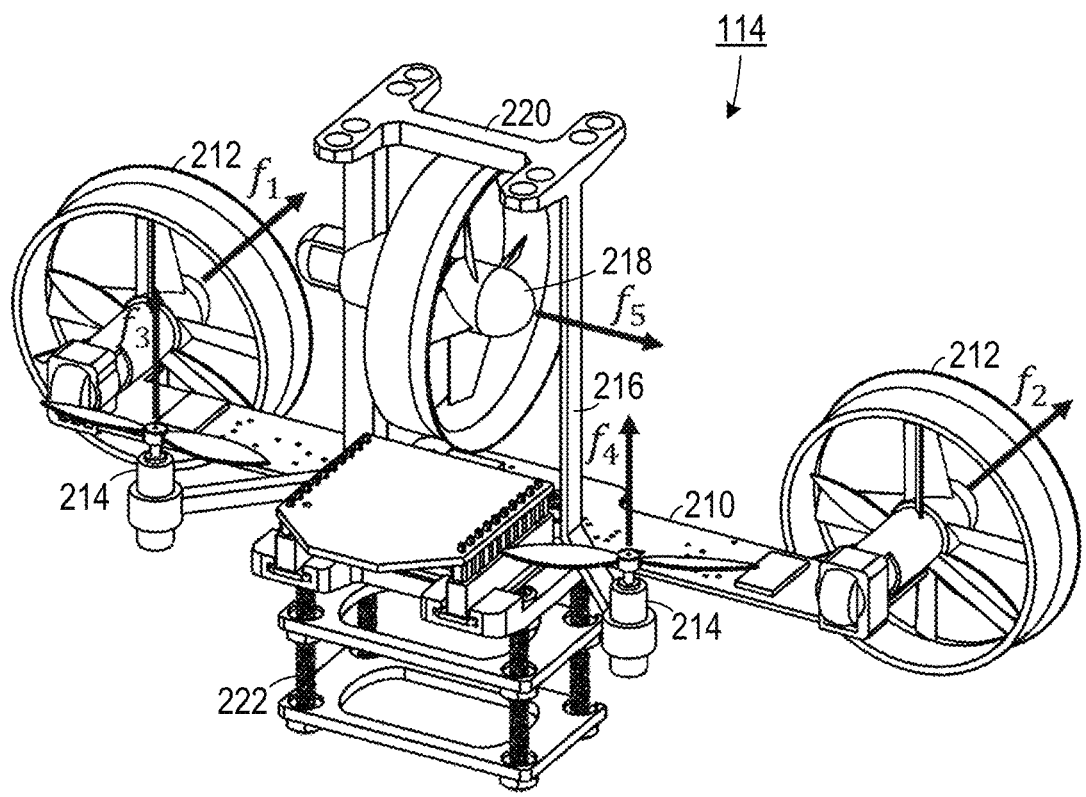
FIG. 2 is a top perspective view of a gondola.

The gondola 114, as shown in FIG. 2, includes a horizontally disposed circuit board 210 as its bottom structural member. Using the circuit board 210 both as an electronic component and as a structural member obviates the need for a separate bottom structural member, thereby saving weight. A vertical member 216 extends upwardly from the circuit board 210 and terminates in a horizontal surface 220 configured for attachment to the envelope 112. Attachment can be effected, for example, by means of a suitable adhesive.

The circuit board includes all necessary on-board electronics, such as a processor (or programmable controller), a computer-readable memory and a wireless chipset that is used for communicating with the ground station 106.

Two X-axis (forward/backward) thrusters 212 are affixed to the circuit board 210, from which they receive power. The X-axis thrusters 212 apply forward and backward thrust to the blimp 110 and can apply differential thrust used to steer the blimp 110. Two Z-axis vertical thrusters 214 provide up and down thrust, which is used to change and maintain the blimp's elevation. A Y-axis side thruster 218 generates left and right thrust, which can be used in Y-axis translation movement of the blimp 110 and in compensating for swing. All of the thrusters include variable-speed electric motors that power propellers and are electrically coupled to the circuit board 210. One or more payload bays 222 may depend downwardly from the circuit board 210.

One experimental embodiment is a miniature autonomous blimp (MAB), which is a small-sized lighter than air robot (LTAR) that is adapted for indoor applications. Owing to the light-weight mechatronics design, the diameter of this MAB is only around 0.7 meters, yet it can have a payload capacity for devices such as a wireless camera. The miniature size of the MAB ensures its mobility in indoor spaces. Because the MAB is cushioned with a helium-filled envelop 112, the robot safe to fly indoors and it poses no threat to humans and the surroundings even collisions occur. With the lifting force provided by buoyancy, the MAB has flight endurance of more than 2 hours. Moreover, the modular design of MAB makes the system expandable for a variety of tasks including environmental mapping and human-robot interaction experiments.

Figure 3:
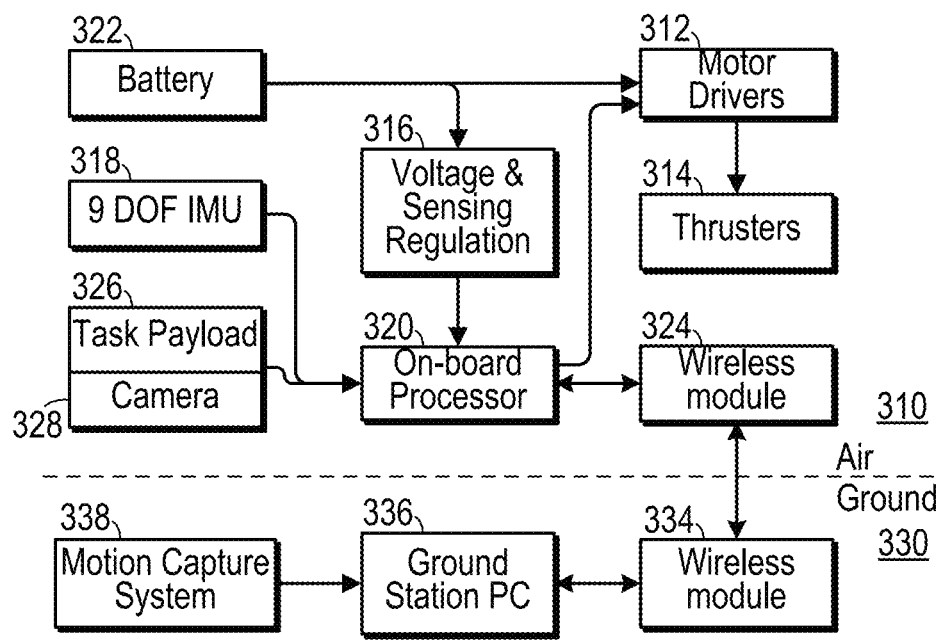
FIG. 3 is a block diagram showing active components of a blimp system.

The functional block diagram of the overall system is shown in FIG. 3. The system includes a ground station 330 and one or more aerial robotic blimps in the air 310. Each robotic blimp includes an on-board processor 320 that provides control signals to motor drivers 312, which drive the thrusters 314. A battery 322 provides power to the system and the processor 320 receives information regarding the powering of the system by a voltage sensing and regulation circuit 316. An inertial measurement unit (IMU) 318 provides motion information to the processor 320 and additional task-specific payload elements (e.g., a video camera 328, such as a monocular analog camera that captures video from a region in front of the blimp) also provide signals to the processor 320. The processor 320 communicates with the ground station 330 via a wireless communications module 324, such as a Wi-Fi (or other wireless communication) chipset.

The ground station 330 communicates with the blimp 310 via its own wireless module 334, which provides information to a ground-based processor 336 (which can be embodied, for example, in a computer, a smart phone, or a dedicated controller) and which takes on much of the computational workload for the blimp 330. A motion capture system 338 can provide location information and motion information about the blimp 330 to the ground station processor 336.

In operation, a specific user stands in front of the blimp and the ground processor detects facial features of the user from video data received from the blimp. In one embodiment, the ground processor detects movement of the facial features of the user from the video signal received from the blimp and generates control signals that are transmitted to the blimp, which cause the blimp to follow the user at a predetermined distance and orientation from the user's face.

The ground processor can also detect hand gestures made by the user and generate a control signals, transmitted to the blimp, that cause the thrusters to take a specified actions when the hand gestures are detected. For example, when the hand is moved horizontally from the face, the blimp can be caused to spin. Also, when the hand is raised upwardly, the blimp can be caused to increase altitude and when it is lowered, the blimp can be caused to decrease altitude.

A feedback element (such as the LED matrix 120), which is in data communication with the blimp processor can generate user-perceptible feedback to the user. For example, illuminating the LEDs as a "R" can indicate that the user's face has been detected; a "check mark" can indicate that the user's hand has been detected; an "X" can indicate that no hand has been detected or that no gesture has been detected; and a "/ in a box" can indicate that a valid hand gesture instruction has been received and is understood by the ground processor.

The ground station interfaces the localization devices, processes computational intensive tasks, and communicates with the blimps wirelessly. The ground station is built around, for example, a desktop or laptop computer for compatibility with the blimp device integration. Also, each single ground station can support multiple blimps simultaneously, allowing for blimp swarm applications and research.

All of the onboard electronics and actuators are integrated on a single gondola. The gondola integrates the onboard electronics and electrical systems including the thruster motors. This configuration provides effective controllability of both attitude and position without adding substantial weight as a result of transferring computationally intense calculations to the ground station.

The gondola has reduced weight, omnidirectional mobility, and more powerful thrusters. IN the experimental embodiment, owing to the compact design, the gondola only weights 24.3 grams without batteries. There are three high-power motors providing thrust for surge, sway and yaw motions, while the two light-weight thrusters are installed to maintain the altitude. This configuration allows the MAB to fly with certain wind disturbance inside the room, while still keeping the robot light-weight. Task related payloads, such as sensors, can be conveniently stacked underneath the gondola, and integrated with the onboard electronics.

Rotational motion, namely pitch and roll movement, can occur in the MAB, which results in lateral and longitudinal oscillation during flight. This undesirable oscillation can impact many applications of the MAB. For example, onboard sensors that sense directionality could output inaccurate readings due to oscillation. Also, the quality of the video stream from the onboard camera can be impacted by unstable movement. Additionally, oscillation consumes extra energy, which can result in reduced flight times. Therefore, the system employs a model of the swing oscillation dynamics and the control system reduces this undesirable motion.

Due to the design and indoor application of the MAB, existing methods for outdoor airships do not apply. The non-conventional shape, the non-smooth envelope, and the slow-flying nature of the MAB are important issues in modeling the swing motion of this robot. In contrast to conventional outdoor airships, which usually have cigar-shaped envelop and tail fins, the MAB features a tailless "saucer shaped" envelop, to obtain adequate buoyancy, omnidirectional mobility, and outstanding safety in indoor spaces. Since hovering and slow-flying are the most common operating scenarios for indoor blimps, while outdoor airships are usually designed for cruising, most wind tunnel tests are generally not applicable in modeling the MAB.

All onboard electronics of the MAB, including the thrusters, are installed on one single 3D printed gondola that mounted underneath the envelop. This configuration reduces weight, ensures alignment between thrusters, and enhances the durability of the MAB. However, since all thrusters are located at the bottom of the robot, the undesired pitching or rolling torque, and as a consequence, swing oscillation, occurs once the motors are on. This disturbance has more significant impact on models in which more powerful thrusters are installed for better maneuverability and fly-ability against the wind. Besides, due to the GPS-denied indoor environment, most miniature blimps use external localization systems, such as OptiTrack and Vicon, to obtain the pose information. These devices usually incorporate multiple ceiling-mounted infrared cameras to track the retroreflective markers installed on the robots. To ensure the visibility to the cameras, the localization markers can only be installed at the top of the envelop, causing large, unknown displacement to the CM of the robot. This displacement induces fluctuated position measurement when the MAB is swinging. The inaccurate position reading significantly impacts the flight controller of the MAB. Moreover, the external localization systems require a ground station computer to interface with the cameras and compute the 3D pose of the MAB.

Other computationally intensive tasks, such as object detection, are also implemented on the ground station computer due to limited payload capacity and to save energy. Therefore, wireless data transmission is required to exchange data between the ground station and onboard electronics of the MAB. However, control system latency of indoor blimps with external localization device and off-board computing is around 0.2-0.4 seconds. The latency is acceptable to control the relatively slow translational and steering motion of the MAB, but may not satisfy the needs to regulate fast swing oscillations.

Figure 4:
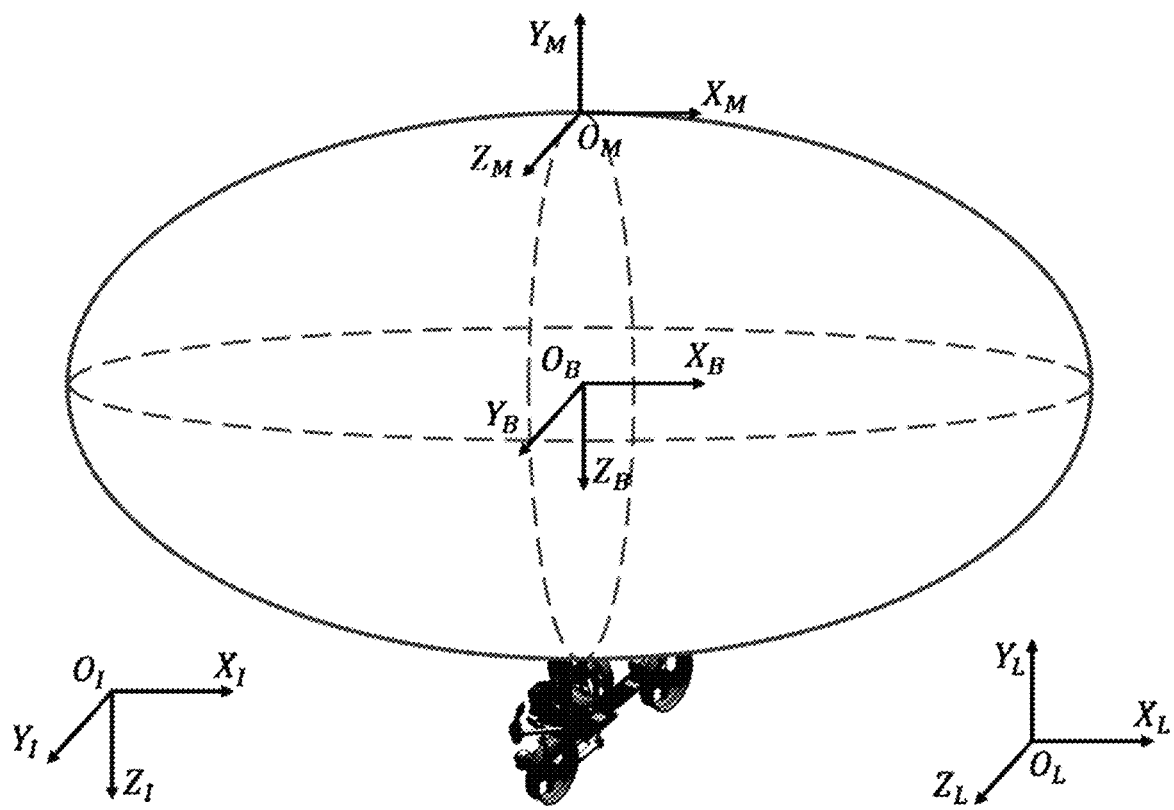
FIG. 4 is a schematic diagram of a blimp showing various forces and axes used in modeling steady state use.

The definition of the inertial frame, body frame, and the coordinates of the localization system are shown in FIG. 4. The inertial frame is denoted as $OI\text{-}X_I Y_I Z_I$ with axis $Z_I$ pointing downward. The body frame $O_B\text{-}X_D Y_B Z_B$ is established at the buoyancy center of the MAB, thus the center of volume (CV) of the envelop. One embodiment employed an optical localization system (OptiTrack) to track the pose of the MAB at millimeter level accuracy. The coordinate system of the motion tracking system is defined as $O_L\text{-}X_L Y_L Z_L$ with Y-up convention. For convenience, we let $O_L$ coincide with $O_I$, and $O_L X_L$ parallel to $O_I X_I$. The localization markers are installed at the top of the envelop for best visibility to the motion tracking system. The pose of the markers in the localization system is denoted as $O_M\text{-}X_M Y_M Z_M$. Given the fact that $O_M\text{-}X_M Y_M Z_M$ is usually calibrated to align with $O_B\text{-}X_L Y_L Z_L$ when the MAB is leveled, one can assume that the plane $X_M Z_M$ is parallel to $X_B Y_B$, and $O_M X_M$ is parallel to $O_B X_B$.

Let $\eta_1 = [x, y, z]^T$ and $\eta_2 = [\varphi, \theta, \psi]$ represent position and orientation of the MAB in inertial frame. Thus pose of the MAB is denoted as $\eta = [\eta_1, \eta_2]^T$. Linear and angular velocity of the MAB in the body frame is described by $v = [V, \Omega]^T$, where $V = [u, v, w]$ and $\Omega = [p, q, r]^T$. The relationship between the velocities in different coordinate frames are given by:

$$\begin{bmatrix} \dot{\eta}_1 \\ \dot{\eta}_2 \end{bmatrix} = \begin{bmatrix} R(\eta_2) & 0_{3\times 3} \\ 0_{3\times 3} & J(\eta_2) \end{bmatrix} \begin{bmatrix} V \\ \Omega \end{bmatrix}, \quad (1)$$

where $R(\eta_2)$ is the rotation matrix. Using the simplified notation $c\bullet = \cos(\bullet)$ and $s\bullet = \sin(\bullet)$, $R(\eta_2)$ has the form of:

$$R(\eta_2) = \begin{bmatrix} c\psi c\theta & -s\psi c\phi + c\psi s\theta s\phi & s\psi s\phi + c\psi s\theta c\phi \\ s\psi c\theta & c\psi c\phi + s\psi s\theta s\phi & -c\psi s\phi + s\psi s\theta c\phi \\ -s\theta & c\theta s\phi & c\theta c\phi \end{bmatrix}. \quad (2)$$

The term $J(\eta 2)$ in Equation I can be represented as:

$$J(\eta_2) = \begin{bmatrix} 1 & 0 & -s\theta \\ 0 & c\phi & s\phi c\theta \\ 0 & -s\phi & c\phi c\theta \end{bmatrix}^{-1} = \begin{bmatrix} 1 & s\phi \tan\theta & c\phi \tan\theta \\ 0 & c\phi & -s\phi \\ 0 & s\phi/c\theta & c\phi/c\theta \end{bmatrix}. \quad (3)$$

The generic 6-DOF dynamics model of the MAB is given as:

$$m(\dot{V} + \Omega \times V) = F + f$$

$$I\dot{\Omega} + \Omega \times (I\Omega) = M + \tau, \quad (4)$$

where m is the total mass of the blimp, including the mass of the Helium gas inside the envelope. The terms $f = [f_x, f_y, f_z]^T$ and $\tau = [\tau_x, \tau_y, \tau_z]^T$ are linear forces and moments generated by the thrusters. Let $F = [F_x, F_y, F_z]^T$ and $M = [M_x, M_y, M_z]^T$ represent the sum of forces and moments due to gravity, buoyancy, and other aerodynamic forces acting on the blimp. The terms f, $\tau$, F, and M are all defined in the body-fixed frame.

The symbol I represents a 3 by 3 inertia matrix about center of mass, which is defined as:

$$I = \begin{bmatrix} I_x & -I_{xy} & -I_{xz} \\ -I_{yx} & -I_y & -I_{yz} \\ -I_{zx} & -I_{zy} & I_z \end{bmatrix}. \quad (5)$$

Owing to the symmetric design of the MAB, namely CM of the robot is on ZB axis, the inertia matrix can be simplified as diagonal with $I_x = I_y$. Similarly, the term $\Omega \times (I\Omega)$ in Equation (4) can be neglected [14]. Therefore, the rotational motion of the MAB can be simplified as:

$$I\dot{\Omega} = M + \tau. \quad (6)$$

and thus, the swing-related pitch and roll motion of the MAB can be decoupled as:

$$I_x \dot{p} = M_x + \tau_x.$$

$$I_y \dot{q} = M_y + \tau_y. \quad (7)$$

Dynamics Model of Pitching Motion: Pitch and roll dynamics of the MAB are decoupled and almost identical. Therefore we only focus on the pitch motion in dynamics modeling and identification. Hence, the attitude and angular velocity are assumed to be $\eta 2 = [0, \theta, 0]^T$ and $\Omega = [0, \theta, 0]^T = [0, \dot{\theta}, 0]^T$. For simplicity, we assume CM is the pivot of the pitching oscillation. Therefore the translational velocity at CM is zero when the MAB is hovering.

Figure 5:
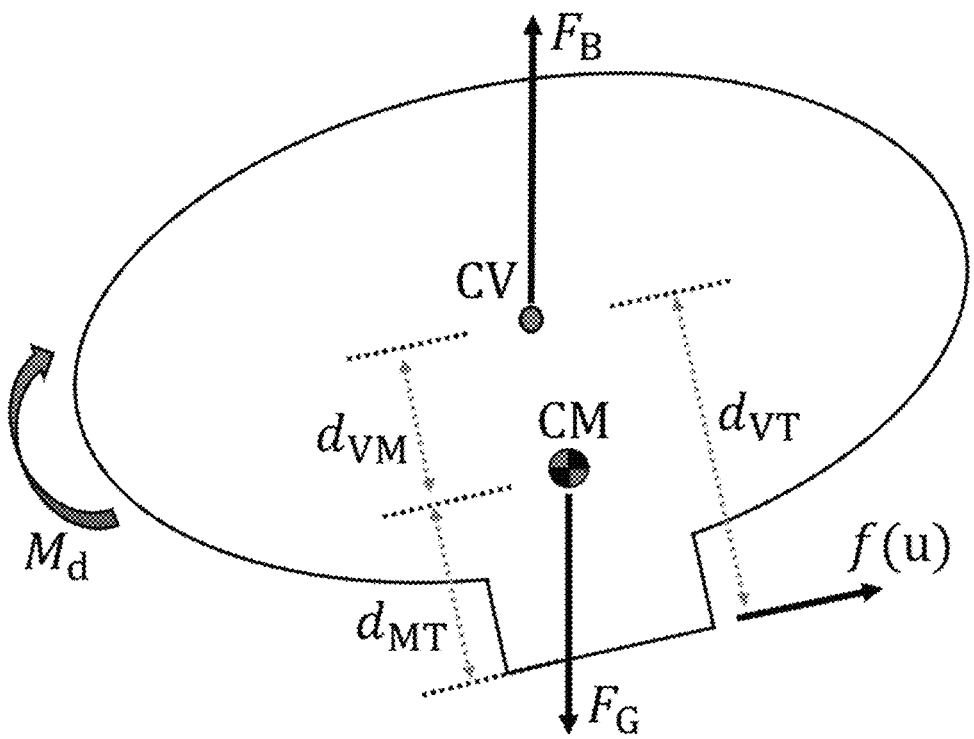
FIG. 5 is a schematic diagram of a blimp showing various forces and axes used in modeling swing forces.

The major forces and moments while the MAB is pitching are shown in FIG. 5. The pair of forces, FB and FG, are the buoyancy and gravitational force at CV and CM. The distance between CV and CM is denoted as $d_{VM}$. Due to this bottom-heavy design, there is gravitational restoring torque, MG, which stabilizes the blimp while it is pitching. f(u) represents the motor thrust in XB direction, where u is the controller output for the corresponding thrusters. Since the thrusters are installed beneath the envelop, the motor-induced torque about CM, $\tau$, will be generated. The rotational inertia and air damping moment about CM are denoted as ICM and $M_d$ separately. Therefore, the pitching motion of the MAB can be described as:

$$I_{CM}\dot{q} = I_{CM}\ddot{\theta} = M_d + M_G + \tau. \quad (8)$$

The aerodynamic damping term, $M_d$, can be assumed to be linear to angular velocity $\dot{\theta}$ for the low-speed indoor blimps. Denote b as the damping coefficient, and Md can be found as:

$$M_d = -b_q = -b\dot{\theta}. \quad (9)$$

The gravitational restoring torque, MG, stabilizes the blimp given that the center of mass is below the center of buoyancy. This stabilization moment, MG, can be represented as:

$$M_G = -F_B d_{VM} \sin(\theta). \quad (10)$$

Due to the displacement between the thrusters and the pitching pivot, the thruster-induced torque $\tau$ is inevitable when motors are turned on. The torque $\tau$ can be found as:

$$\tau = d_{MT} f(u). \quad (11)$$

Therefore, the pitching dynamics of the MAB described in Equation 8 can be expanded as:

$$I_{CM}\ddot{\theta} = -b\dot{\theta} - F_B d_{VM} \sin(\theta) + d_{MT} f(u). \quad (12)$$

As shown in FIG. 5, the term $d_{MT}$ can be written as $d_{MT} = d_{VT} - d_{VM}$, where $d_{VT}$ is a constant parameter from the dimension measurements. The MAB is neutrally ballasted prior to each flight, thus we can assume that the total buoyancy FB is equal to the total gravitational force, hence FB=FG=mg, where g is gravitational constant. Therefore, the pitching dynamics in Equation (12) can be written as:

$$I_{CM}\ddot{\theta} = -b\dot{\theta} - d_{VM}\sin(\theta)mg - (d_{VT} - d_{VM})f(u). \quad (13)$$

Grey Box Model

The terms $d_{VM}$, $d_{VT}$, m, and f(u) in Equation (13) can be calculated or measured with relatively good accuracy. However, the air damping coefficient b, and the moment of inertia ICM, cannot be easily estimated due to the complex aerodynamics effects and the unconventional shape of the MAB. Therefore, a grey box model is constructed to represent the pitching dynamics of the MAB, where the model structure is explicitly specified, and the parameters are partially known. Denote the angle and angular rate of the MAB's pitching motion as $x=[\theta, \dot{\theta}]^T$, and the grey box model can be represented as:

$$\bar{x}_1 = x_2$$

$$\bar{x}_2 = [-bx_2 - mgd_{VM}\sin(x_1) + (d_{VT} - d_{VM})f(u)]/I_{CM}. \quad (14)$$

Parameter Identification

Figure 6:
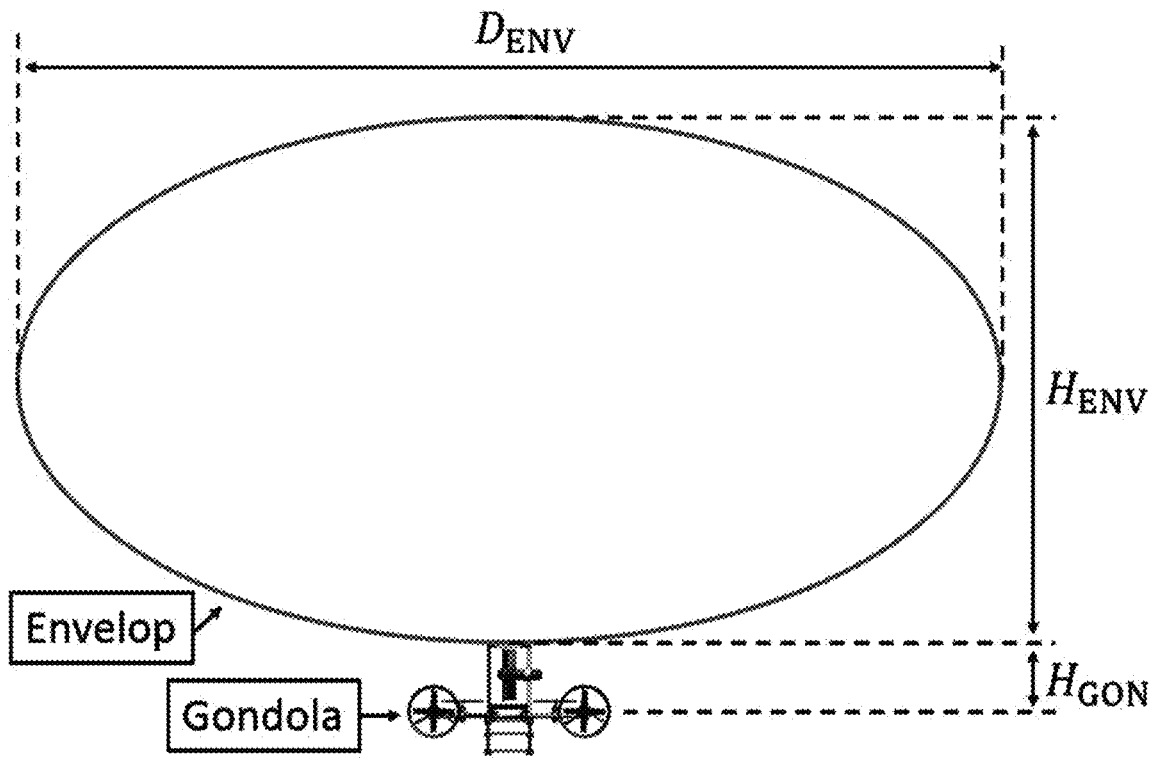
FIG. 6 is a schematic diagram of a blimp showing certain dimensions.

The parameter $d_{VT}$ is the distance between the center of volume (CV) and the motor thrust force f, as demonstrated in FIG. 5. In contrast to large outdoor airships which usually adjust their buoyancy by changing the volume of air and helium, the MAB uses thrusters to adjust its altitude due to the miniature size and high maneuverability. Therefore, the dimension of the MAB is consistent, and can be considered as a rigid body when inflated. Owing to this, $d_{VT}$ is a constant parameter and can be calculated as:

$$d_{VT} = H_{ENV}/2 + H_{GON}, \quad (15)$$

where $H_{ENV}$ and $H_{GON}$ are the thickness of the envelop and the height of the gondola, as illustrated in FIG. 6. With the measurement $H_{ENV}=0.44$ m and $H_{GON}=0.04$ m, we have $d_{VT}=0.26$ m.

Figure 7:
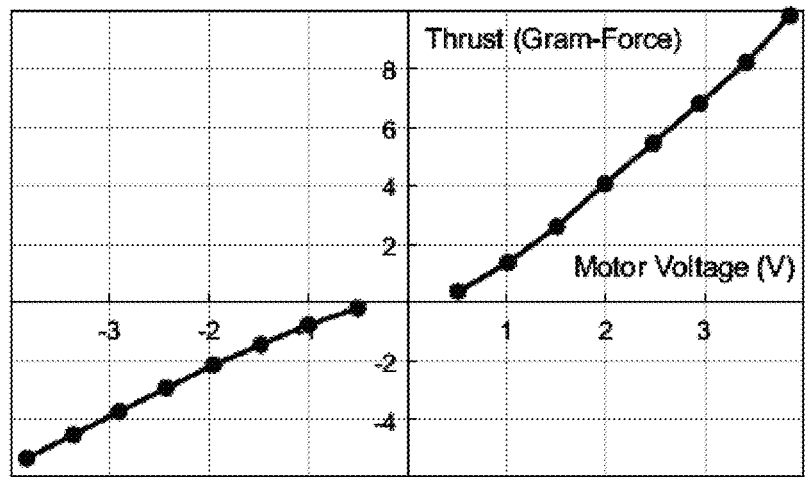
FIG. 7 is a graph relating thrust to motor voltage.

The parameter f(u) represents the mapping between the motor thrust and the input command. The command u∈[−1, 1] represents the duty circle that controls the DC motor of the MAB. Positive u will result in the motor thrusting in XB direction, while negative value will generate force oppositely. Neglecting the resistance of the electronics such as H-bridge, we can approximate the voltage applied on the motor as:

$$V_{motor} = V_{batt} \cdot u_i \quad (16)$$

where $V_{batt}$ is the voltage of the battery, which can be measured by the circuitry on the MAB. The motor thrust is measured with a high-accuracy scale. The relationship between the motor thrust and the applied voltage is shown in FIG. 7.

The total mass of the MAB, m, can be hard to be directly measured since the Helium gas inside the envelop cannot be easily gauged. Instead, by measuring the lifting force provided by the envelop, we can derive the total buoyancy of the MAB, and therefore find the total mass of the vehicle. Let $F_{lift}$ be the lifting force provided by the envelop, which is equal to the total buoyancy FB minus the gravitational forces of the Helium gas and the deflated envelop. Moreover, since the MAB is neutrally buoyant, $F_{lift}$ equals to the gravitational force of all the components that are attached on the envelop, thus the gondola assembly, the ballast weight, and the localization trackers. Therefore, $F_B$ and $F_{lift}$ can be represented as follows:

$$F_{lift} = F_B - (m_{env} + m_{He})g \quad (17)$$
$$= (m_{gon} + m_{mkr} + m_{blst})g$$

$$F_B = (m_{env} + m_{He})g + (m_{gon} + m_{mkr} + m_{blst})g, \quad (18)$$

where $m_{env}$, $m_{He}$, $m_{gon}$, $m_{mkr}$, $m_{blst}$ are the mass of the deflated envelop, helium gas, gondola assembly, localization makers, and the ballast weight to keep the MAB neutrally buoyant. According to Archimedes' principle, and assuming the envelop dominates the volume of the MAB, we can find that the total buoyancy $F_B$ is equal to the weight of air that the envelop displaces. Then, Eq. (18) for $F_B$ can be written as:

$$F_B = \rho_{air} V_{env} g \quad (19)$$
$$= (m_{env} + m_{He})g + (m_{gon} + m_{mkr} + m_{blst})g,$$

where $\rho_{air}$ and $V_{env}$ are the density of air and the volume of the envelop. Given that the mass of the helium gas is:

$$m_{He} = \rho_{He} V_{He} = \rho_{He} V_{env}, \quad (20)$$

and the volume of the envelop can be calculated as:

$$V_{env} = \frac{m_{gon} + m_{mkr} + m_{blst} + m_{env}}{\rho_{air} - \rho_{He}}. \quad (21)$$

Assuming the temperature of the indoor environment is around 300K (26.85° C.), density of both helium and air is known as $\rho_{He}=0.164$ kg/m$^3$ and $\rho_{air}=1.161$ kg/m$^3$. With the total mass of the components in Eq. (21) measured to be 107.24 grams, the total mass of the MAB, m, can be calculated as:

$$m = \rho_{air} V_{env} = 0.1249 \text{ kg}. \quad (22)$$

With the mass of all components of the MAB measured and calculated above, we use CAD software to calculate the position of the $C_M$, namely $d_{VM}$, and the rough estimation of the moment of inertia, ICM. An estimated ICM will be used.

The envelop of the MAB is modeled as an ellipsoid in the CAD software. The dimension of the inflated envelop can be calculated by its deflated radius as:

$$r_{in} \approx 0.7627 \, r_{de}$$

$$\tau_{in} \beta 0.9139 \, r_{de} \quad (23)$$

where $r_{de}$ is the radius of the deflated envelop, and $r_{in}$ and $\tau_{in}$ are the radius and thickness of the envelop when inflated. Therefore, the ellipsoid CAD model with dimension $r_{in}$ and $\tau_{in}$ is constructed with measurement $r_{dc}$=0.457 m. With Autodesk Inventor software, it was found that $d_{VM}$=0.0971 m and ICM=0.00371 kg·m.

Now ICM and b are the only two unknown parameters in the grey box model described in Eq. (14). A series of system identification experiments are designed to obtain these parameters. The MAB was released with initial pitch angle $\theta_0$, and the motion capture system (OptiTrack) logs the free response of the pitching oscillation. The experiment was repeated eight times with different initial angle $\theta_0$. The first seven datasets are used for identifying the parameters and the last one is for validation.

As listed in Table 1, below, seven ICM and b pairs are identified from the first seven datasets with MATLAB System Identification Toolbox. The fitting between the measured and modeled system is quantified as normalized root-mean-square error (NRMSE). The final estimations of ICM and b are found as the average of the seven identified results in Table 1, which are ICM=0.005821 kg·m² and b=0.000980N·m·s/rad.

TABLE 1

Parameters Identified from the Experimental Datasets

| Dataset | $I_{CM}$ | b | NRMSE Fit |
|---|---|---|---|
| Dataset 1 | 0.005782 | 0.000838 | 82.16% |
| Dataset 2 | 0.005847 | 0.000978 | 85.45% |
| Dataset 3 | 0.005835 | 0.000940 | 84.29% |
| Dataset 4 | 0.005828 | 0.001140 | 85.20% |
| Dataset 5 | 0.005851 | 0.001083 | 87.26% |
| Dataset 6 | 0.005750 | 0.001025 | 77.80% |
| Dataset 7 | 0.005855 | 0.000857 | 85.21% |
| Mean | 0.005821 | 0.000980 | 83.91% |

Table 2, below, summarizes the parameters of the dynamics model obtained above. Therefore, the pitching dynamics model of the MAB in Eq. (13) can be represented as:

$$\ddot{\theta} = -20.4284 \sin(\theta) - 0.1684\dot{\theta} + 27.9933 f(u). \tag{24}$$

TABLE 2

Parameters of GT-MAB's Pitching Dynamics Model

| Parameters | Value |
|---|---|
| g | 9.81 m/s² |
| $I_{CM}$ | 0.005821 kg · m² |
| b | 0.000980 N · m · s/rad |
| $m_{ASM}$ | 0.1249 kg |
| $d_{VT}$ | 0.26 m |
| $d_{VM}$ | 0.097051 m |

The identified model is then linearized around θ=θ̇=0 for controller design. State space representation of the linearized model can be written as:

$$\begin{bmatrix} \dot{x}_1 \\ \dot{x}_2 \end{bmatrix} = \begin{bmatrix} 0 & 1 \\ -20.4284 & -0.1684 \end{bmatrix} \begin{bmatrix} x_1 \\ x_2 \end{bmatrix} + \begin{bmatrix} 0 \\ 27.9933 \end{bmatrix} f(u), \tag{25}$$

where $x = [\theta, \dot{\theta}]^T$. This linearized model was compared with the eighth dataset d for validation. The linearized model has a 88.37% NRMSE fit.

Figure 8:
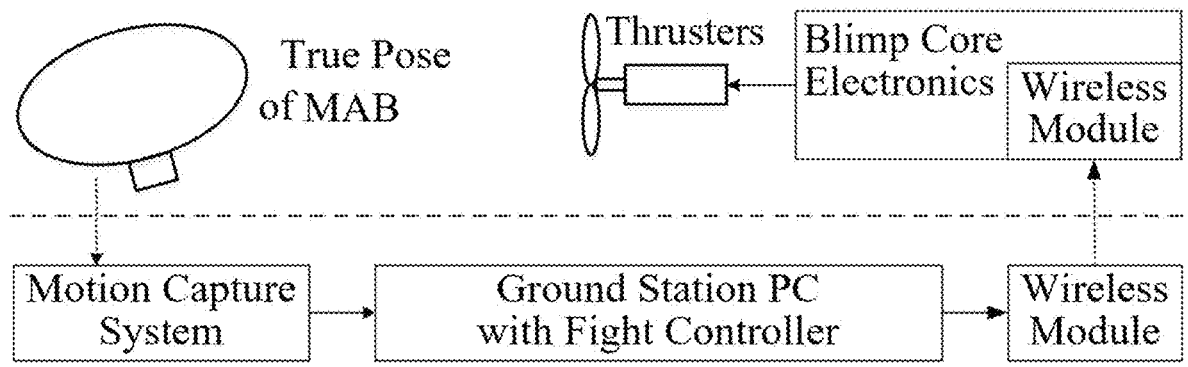
FIG. 8 is a schematic diagram of showing ground station interaction with a blimp.

Flight Control System: As discussed in Section 1, the under actuated design, displacement between the localization markers and the CM, and control system latency are the major difficulties in stabilizing the swing oscillation of the MAB. A swing reducing flight control system is developed that addresses these difficulties. Feedback controllers are designed to reduce the swing oscillation of this under-actuated robot, CM position is estimated from the identified parameters of the swing dynamics, and control system latency is reduced by improving both hardware and software implementation of the platform System overview: The overall structure of the flight control system is shown in FIG. 8. The Pose of the MAB is estimated by tracking of the localization markers placed on top of the envelope. A ground station computer interfaces the motion capture system, and runs the flight controller software. The control commands are transmitted to the MAB via wireless communication, and the onboard electronics of the blimp drive the thrusters once a command is received.

Figure 9:
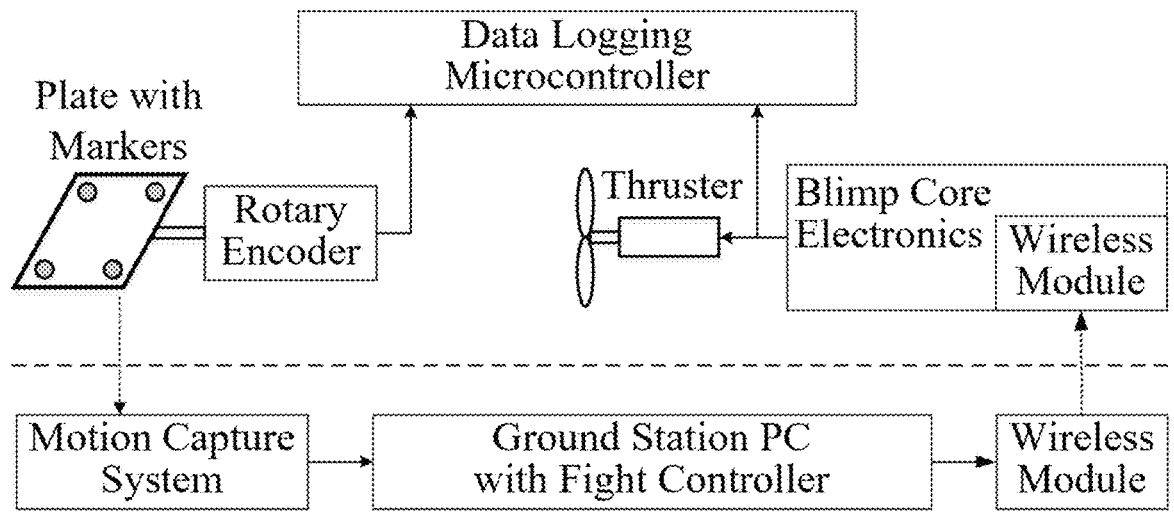
FIG. 9 is a schematic diagram of a blimp showing a motion capture system employed with a blimp.

System latency reduction: The fast dynamics of the swing motion requires low latency from the flight control system. The latency is reduced by improving the software implementation on the base station computer, reducing the response time of the MAB's onboard electronics, and enhancing the wireless communication. As shown in FIG. 9, an experiment is designed to measure the delay in the control loop. By comparing the true attitude from the rotary encoder, and the voltage applied on the thruster, we found the latency of the control system to be around 30.5 ms. Given its magnitude, the control system latency can be neglected.

To further reduce the response time of the MAB, core-less DC motors are chosen for its low rotor inertia.

$$\begin{bmatrix} \dot{x}_1 \\ \dot{x}_2 \end{bmatrix} = \begin{bmatrix} 0 & 1 \\ 0 & -1/\tau \end{bmatrix} \begin{bmatrix} x_1 \\ x_2 \end{bmatrix} + \begin{bmatrix} 0 \\ \beta/\tau \end{bmatrix} V_{motor}, \tag{26}$$

where $x_1, x_2$ represent the shaft angle and angular velocity of the thruster.

Figure 10:
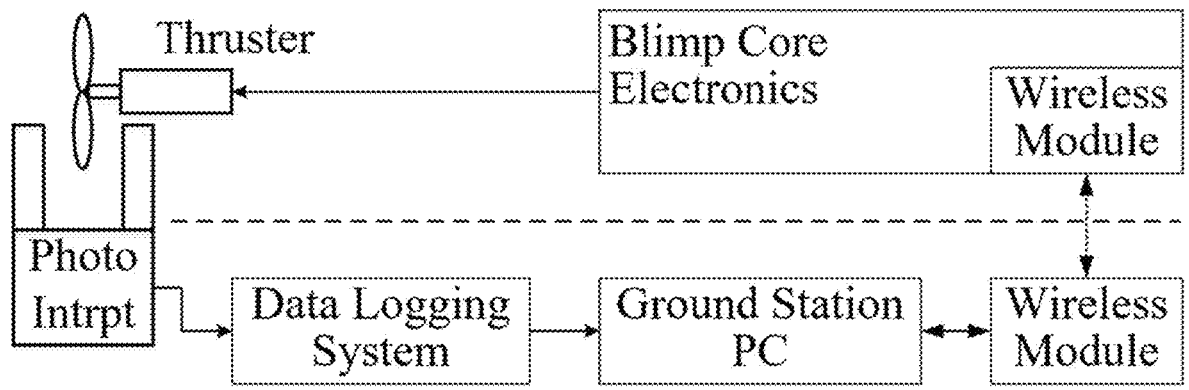
FIG. 10 is a schematic diagram showing an experimental apparatus for collecting thruster data.

The terminal voltage on the motor is denoted as $V_{motor}$. Parameters τ and β are a time constant and a static gain that characterize the motor response. With the experiment setup shown in FIG. 10, the step response of the thruster is collected. The DC motor model is fit to the step response measurement, and obtain the time constant τ=31.8 ms. Compared to the period of the pitching oscillation, the motor response time can be neglected.

Figure 11:
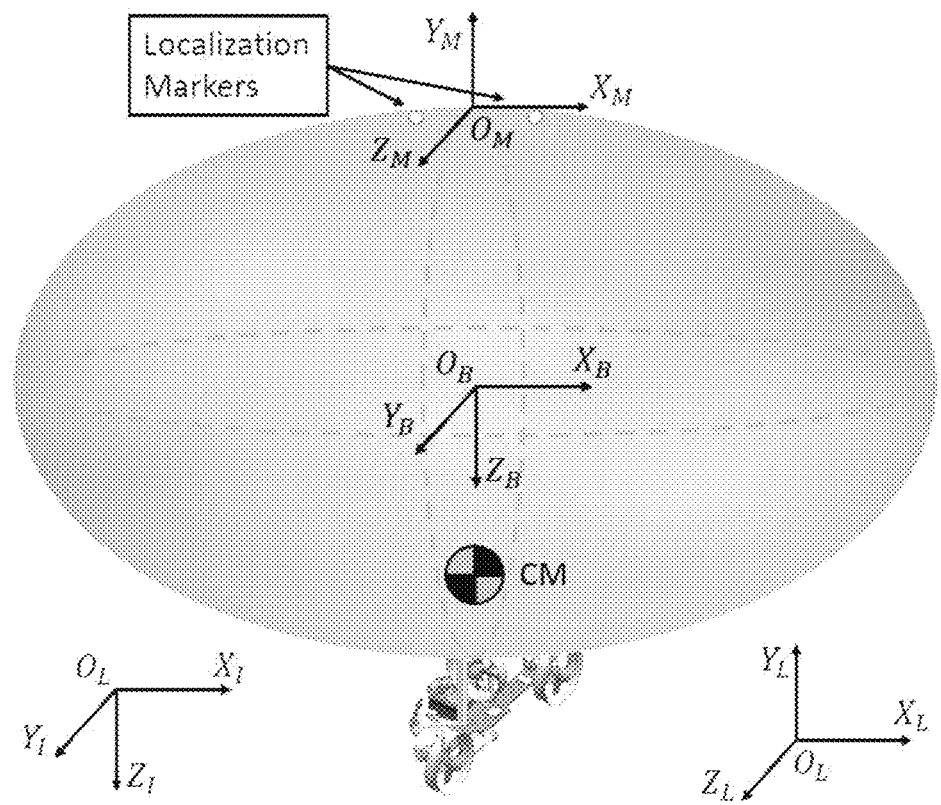
FIG. 11 is a schematic diagram showing use of localization markers on a blimp.

Center of Mass Position Estimation: As shown in FIG. 11, the localization markers are placed at the top of the MAB for better visibility to the motion tracking cameras. However, due to the displacement between $O_M$ and $C_M$, the position measurement of the markers has large fluctuation while the MAB is swinging. This inaccurate position measurement usually impacts the flight control of the MAB.

The position of CM can be estimated from the pose measurement of the markers. We define the vector $^B p_{CM}$ to represent the position of CM in the body frame. Given the fact that OM is usually on ZB axis, $^B p_{CM}$ can be simplified as:

$$^B p_{CM} = [0, 0, -d_{VM}]^T, \tag{27}$$

Since the only measurement from the motion tracking system is the pose of $O_M X_M Y_M Z_M$ in $O_L X_L Y_L Z_L$, a series coordinate transformations are required to find the $C_M$ position in inertial frame. We begin with representing the vector $^B p_{CM}$ in $O_M X_M Y_M Z_M$:

$$^M p_{CM} = ^M_B R \, ^B p_{CM} + ^M_B q, \tag{28}$$

where $^M_B R$ are the rotation matrix between $O_H X_B Y_B Z_B$ M. $O_M X_M Y_M Z_M$, and $_B q$ is the position of $O_B$ in $O_M X_M Y_M Z_M$. Since the relationship between these two frames are already known, we have:

$$^M_B R = \begin{bmatrix} 1 & 0 & 0 \\ 0 & 0 & -1 \\ 0 & 1 & 0 \end{bmatrix} \tag{29}$$

$$^M_B q = [0, -H_{ENV}/2, 0]^T.$$

Similarly, $^M p_{CM}$ can be represented in $O_L X_L Y_L Z_L$ as:

$$^L p_{CM} = {}^L_M R {}^M p_{CM} + {}^L_M q, \quad (30)$$

where $^L_M R$ and $^L_M q$ represents the pose of the markers from the motion capture system. Then, CM position in inertial frame can be calculated as:

$$^I p_{CM} = {}^I_L R {}^L p_{CM} + {}^I_L q. \quad (31)$$

With the relation between $O_L X_L Y_L Z_L$ and $O_I X_I Y_I Z_I$ previously defined, we know that:

$$^I_L R = \begin{bmatrix} 1 & 0 & 0 \\ 0 & 0 & 1 \\ 0 & -1 & 0 \end{bmatrix} \quad (32)$$

$$^I_L q = [0, 0, 0]^T.$$

Therefore, with the simplified notation $c\bullet = \cos(\bullet)$ and $s\bullet = \sin(\bullet)$, CM position in inertia frame can be found as:

$$^I p_{CM} = \begin{bmatrix} x_L + \left(\frac{H_{ENV}}{2} + d_{VM}\right)(c\phi_L s\psi_L - c\psi_L s\theta_L s\phi_L) \\ z_L - \left(\frac{H_{ENV}}{2} + d_{VM}\right) c\theta_L s\phi_L \\ -y_L + \left(\frac{H_{ENV}}{2} + d_{VM}\right)(c\phi_L c\psi_L + s\phi_L s\psi_L s\theta_L) \end{bmatrix} \quad (33)$$

where $[x_L, y_L, z_L]^T$ and $[\phi_L, \theta_L, \psi_L]^T$ are the position and Euler angle of the markers from the localization system.

Figure 12:
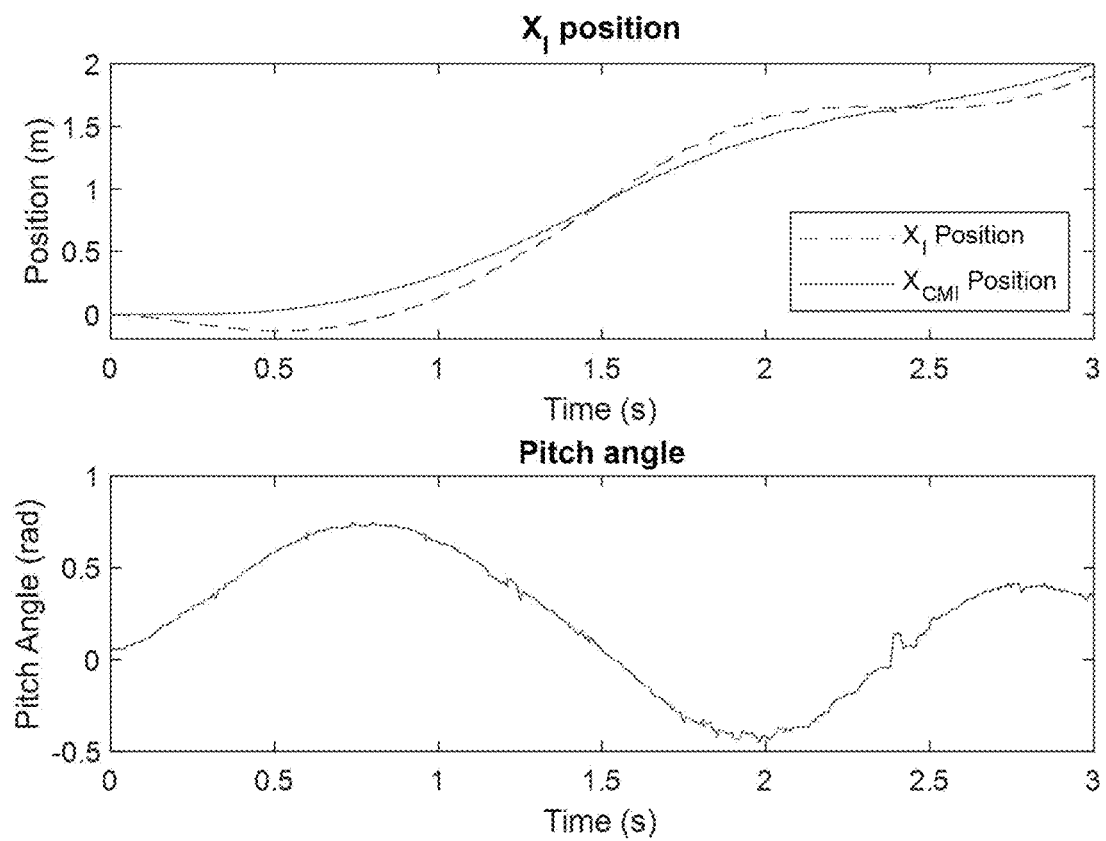
FIG. 12 is a pair of graphs relating blimp position an d pitch angle to time.

An experiment is designed to verify the effectiveness of this feature. Before the experiment begins, the MAB is stationary with all motors turned off. Hence the blimp is leveled with no translational or angular velocity. Then, the blimp is commanded to fly forward along XI axis at maximum throttle for 1 second, causing large swing oscillation due to its under-actuated design. The positions of both OM and CM are logged for comparison. As illustrated in FIG. 12, large fluctuation is observed from the position measurement of the localization markers when the MAB is swinging. In contrast, there is significantly less oscillation from the estimated CM position.

Feedback controller design: Station keeping is one of the most common operating scenarios of the MAB. A flight controller is designed to keep the MAB at desired position while simultaneously compensate the swing oscillation. The method includes a station-keeping controller that tracks the position and heading of the MAB, and a swing-reducing controller which reduces the roll and pitch oscillation of the robot.

The station-keeping controller keeps the MAB at the desired position $^I p_{ref} = [^I x_{ref}, y_{ref}, z_{ref}]^T$, and holds the heading of the robot at $\psi_{ref}$. As discussed above, the CM position of the MAB has significantly less fluctuation compared to that of the localization markers. Therefore, we use $p_{CM}$ to represent the position of the MAB. Hence, the distance and heading error can be calculated as:

$$^I e_{pos} = {}^I p_{ref} - {}^I p_{CM}$$

$$e_{hdg} = \psi_{ref} - \psi \quad (34)$$

Due to the discontinuity in heading angle representation, the heading error $e_{hdg}$ is then wrapped to $[-\pi, \pi]$.

PID controllers are implemented to minimize the position and heading error. The controller outputs are denoted as $u_{pos} = [^I u_x, u_y, u_z]^T$ and $u_\psi$ separately. These outputs are then transferred to the MAB's body frame as:

$$^B u_r = u_\psi \quad (35)$$

$$^B u_{pos} = {}^B_I R {}^I u_{pos}$$
$$= [^B u_x, ^B u_y, ^B u_z]^T,$$

where $^B_I R$ is the rotation matrix between the inertia and body frame.

The swing-reducing controller stabilizes the roll and pitch oscillation of the MAB. Set points of the angular rates are set to zero to compensate the oscillation. Therefore, the swing rate error can be found as:

$$e_{swing} = [-p, -q]^T \quad (36)$$

where p and q are the angular velocity of the MAB along $X_B$ and $Y_B$ axes in the body frame. From Eq. (3), these angular rates can be found as:

$$p = \dot\phi - \dot\psi \sin\theta$$

$$q = \dot\theta \cos\phi + \dot\psi \sin\phi \cos\theta \quad (37)$$

where $\phi$, $\theta$, and $\psi$ are the roll, pitch, and yaw of the MAB.

PID controllers are designed to reduce the swing-related angular velocities, and the controller outputs are denoted as $u_p$ and $u_q$. In the MAB's body frame, the outputs can be written as:

$$^B u_p = u_p$$

$$^B u_q = u_q. \quad (38)$$

For convenience, we denote all rotation-related controller outputs as:

$$^B u_{rot} = [^B u_p, ^B u_q, ^B u_r]^T. \quad (39)$$

Mixer Design

The outputs from the stationary keeping and swing reducing controllers, namely $u_{pos}$ and $u_{rot}$, represent the force and torque demanded from the thrusters. Returning to FIG. 2, the MAB has five gondola-mounted thrusters, with propulsion force denoted as f1 to f5 separately. To map the controller outputs to the actual thrusters of GTMAB, a mixer is designed as:

$$\begin{bmatrix} f_1 \\ f_2 \\ f_3 \\ f_4 \\ f_5 \end{bmatrix} = \begin{bmatrix} 1 & 0 & 0 & 0 & \frac{1}{d_{MT_1}} & \frac{1}{d_{SM}/2} \\ 1 & 0 & 0 & 0 & \frac{1}{d_{MT_2}} & \frac{-1}{d_{SM}/2} \\ 0 & 0 & 1 & 0 & 0 & 0 \\ 0 & 0 & 1 & 0 & 0 & 0 \\ 0 & 1 & 0 & \frac{-1}{d_{MT_5}} & 0 & 0 \end{bmatrix} \begin{bmatrix} ^B u_x \\ ^B u_y \\ ^B u_z \\ ^B u_p \\ ^B u_q \\ ^B u_r \end{bmatrix}, \quad (40)$$

where $dMT_1$, $dMT_2$, and $dMT_5$ represents the distance between the CM and the thrusters with propulsion force $f_1$, $f_2$, and $f_5$ along $Z_B$ axis. $dS_M$ is the distance between the two surge motors with thrust force $f_1$ and $f_2$. Due to the efficiency loss when the thrusters are operated in reversed directions (as shown in FIG. 7), we limit the output of the thrusters in forward direction to compensate the asymmetric thrust-voltage curve. The MAB is able to stabilize the swing motion though there exists certain noise from the motion capture system.

Human Detection and Tracking: The implementation of human following behavior on the MAB involves three steps: 1) detecting a human face in real-time video stream, 2) estimating the relative position between the blimp and human, and 3) using vision-based estimation to control the movement of blimp to follow the human.

This is based on human face detection because the face is the most distinctive feature separating a human from other objects. The system implements a robust face detection algorithm using Haar features and cascade classifier. A Haar feature considers patterned adjacent rectangular regions at a specific location in a face image, sums up the pixel intensities in each region and calculates the difference between these sums. The values computed based on Haar features are used to train a large number of weak classifiers whose detection qualities are slightly better than random guessing. Then weak classifiers are organized in classifier cascades using the AdaBoost method to form strong classifiers, which can robustly determine whether an image contains a human face.

The system employs two image sets for training Haar features, one is for front face and the other is for side face, so that the blimp can recognize a human from different angles. Due to the poor quality and noise from the blimp camera, the robust real-time face detection algorithm in cannot guarantee continuous and reliable face detection in our case. To obtain stable detection of a human, rather than running human face detection every frame, this method uses the Kanade-Lucas-Tomasi (KLT) algorithm to track the face after the human face is detected, which is computationally more efficient and robust than detecting the face each frame.

Figure 13:
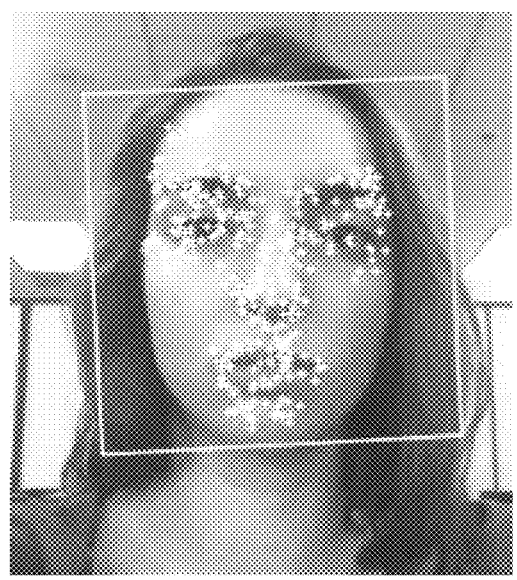
FIG. 13 is an image demonstrating facial recognition.

Algorithm 1, below, presents the pseudocode for the human face detection and tracking algorithm. The algorithm has two modes: face detection and KLT tracking. 1) The algorithm detects the human face using Haar features for the first several frames to prevent misdetection. Once a human face is detected, it extracts the feature points within the face region for the tracking mode. 2) In the face tracking mode, the algorithm matches the corner feature points of the new frame with the corner feature points from the previous frame, and it estimates the geometric displacement between these two sets of corner points. The displacement vector is applied to the previous face bounding box to obtain the new bounding box, so the algorithm can continuously track the human face. Once the number of corner points is below a certain threshold b, the mode switches back to face detection. A frame of the blimp video processed with algorithm 1 is shown in FIG. 13. The white rectangle is the bounding box that the algorithm recognizes as the area of the human face and the white crosses are the corner feature points. Based on the bounding box of the human face, we can obtain the coordinates of the center of human face in image frame, denoted as $[i_p; j_p]^T \in R2$ and the face length $l_f$, where $i_p$, $j_p$ and $l_f$ are in units of pixels. And we use the variable $S_f$ to record which side of the human is detected.

| Algorithm 1: Face Detection and Tracking |
|---|
| Data: Video Stream |
| Result: Face center $[i_p, j_p]^T$, face length $l_f$ and side of the face $S_f$ |
| 1  FrameNum = 1, FeatureNum = 0; |
| 2  while Video is not ended do |
| 3     if FrameNum ≤ a or FeatureNum ≤ b then |
|       /*Detection Mode*/ |
| 4        Run frontal and side face detection and determine the bounding box of face; |

| Algorithm 1: Face Detection and Tracking |
|---|
| 5        Save which side of face is detected in $S_f$; |
| 6        Detect corner points and re-initialize the KLT point tracker within the bounding box; |
| 7        Calculate the number of corner points FeatureNum; |
| 8     else |
|       /*Tracking Mode*/ |
| 9        Estimate the geometric displacement between the corner points in previous frame and the corner points in the current frame; |
| 10       Apply the displacement vector to the bounding box in previous frame to obtain new bounding box; |
| 11       Run side face detection within the ¼ frame around the bounding box, set value for $S_f$ if a side face is detected; |
| 12       Update FeatureNum with the number of corner points within the new bounding box; |
| 13    Set the face center $[i_P, j_P]^T$ to be the center of bounding box and face length $l_f$ to be the length of the bounding box; |
| 14    FrameNum = FrameNum + 1; |

The method localizes the blimp using vision from a camera only. This is different from most other blimps which utilize external localization system, such as GPS or indoor 3D localization.

We assume that the camera satisfies the pinhole camera model, which defines the relationship between a 3D point [x, y, z]$\in R^3$ in the camera coordinate $X_C$–$Y_C$–$Z_C$ and a 2D pixel $[i, j]^T$ in the image frame.

$$\begin{bmatrix} i \\ j \\ 1 \end{bmatrix} = \begin{bmatrix} f_i & 0 & i_0 & 0 \\ 0 & f_j & j_0 & 0 \\ 1 & 0 & 1 & 0 \end{bmatrix} \begin{bmatrix} x \\ y \\ z \\ 1 \end{bmatrix} \quad (41)$$

where $f_i$ and $f_j$ are the focal length in i and j directions, and white crosses are the corner feature points.

Based on the bounding box of the human face, we can $[i_0, j_0]^T$ is the optical center of the camera. Here we assume that $f_x$ and $f_y$ are both equal to the same focal length f and $[i_0, j_0]^T$ is the center of the image.

Reversely, if we know the focal length f of the camera and the actual depth z of the face center, we can reconstruct the 3D point $[x, y, z]^T$. However, since the wireless camera on GT-MAB is a monocular camera, we cannot directly obtain the accurate depth information of the human. In order to reconstruct the 3D point, we proposed a method to estimate the depth of the human face.

Figure 14:
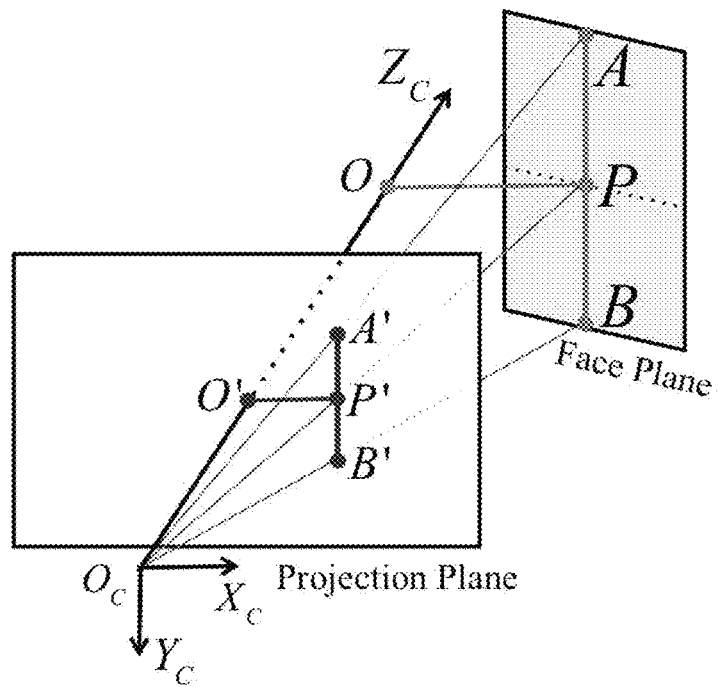
FIG. 14 is a schematic diagram showing planes and relationships used in human position estimation.

The illustration of human position estimation is shown in FIG. 14. Because the pitch and roll angles of blimp are very small, we can assume that the camera projection plane is always perpendicular to the ground, i.e. YC is perpendicular to the ground. This assumption does not hold for quad-rotors because quad-rotors need to change the pitch angle to fly forward or backward. Extra information is needed to estimate the height of quad-rotors. Blimp provides certain convenience to support vision-based HRI algorithms because the pitch and roll angles of the on-board camera can be controlled to stay at zero. Line AB represents the centerline of the human face and we assume it is parallel to the image plane, i.e. plane of human face is also perpendicular to the ground. Point $P=[x_p, y_p, z_p]^T$ is the center point of line AB. Points A', B' and P' are corresponding projection points.

We denote the actual length of the human face as $L_0:=|AB|$ and denote the length of the human face in camera projection plane as $l_f:=|A'B'|$.

First, we measure the human face length $L_0$ in units of meters. The human stands away from the camera at a fixed distance $d_0$ and the position of blimp is adjusted such that the center of the human face is at the center of image frame. Then we record how many pixels the human face has in the image, denoted as $l_f^0$. Given $l_f^0$, $d_0$ and $L_0$ as known prior knowledge, the focal length f can be expressed as:

$$f = d_0 \frac{l_f^0}{L_0} \tag{42}$$

Once we get the measurement lf from a frame, it should satisfy the following equation:

$$\frac{l_f}{L_0} = \frac{|A'B'|}{|AB|} = \frac{|O_C P'|}{|O_C P|} = \frac{|O_C O'|}{|O_C O|} = \frac{f}{z_P} \tag{43}$$

(Note that this equation holds only if line AB is parallel to the projection plane.)

Substitute f using equation 42, we can estimate the center of the human face $[\hat{x}_p, \hat{y}_p, \hat{z}_p]^T$ in the camera coordinate frame based on the coordinate $[i_p, j_p]^T$ of P':

$$\hat{z}_P = d_0 \frac{l_f^0}{L_0} \frac{L_0}{l_f} = d_0 \frac{l_f^0}{l_f}$$

$$\hat{x}_P = \frac{\hat{z}_P(i_P - i_0)}{f} = \frac{(i_P - i_0)}{l_f^0 \cdot d_0 / L_0} \cdot d_0 \frac{l_f^0}{l_f} = \frac{L_0(i_P - i_0)}{l_f}$$

$$\hat{y}_P = \frac{\hat{z}_P(j_P - j_0)}{f} = \frac{(j_P - j_0)}{l_f^0 \cdot d_0 / L_0} \cdot d_0 \frac{l_f^0}{l_f} = \frac{L_0(j_P - j_0)}{l_f} \tag{44}$$

The necessary measurements, i.e. distance d', height h' and yaw angle $\psi'$, can be calculated based on $[\hat{x}_p, \hat{y}_p, \hat{z}_p]^T$, $$\hat{d} = \sqrt{\hat{x}_P^2 + \hat{z}_P^2}, \hat{h} = h_0 - \hat{y}_P, \text{ and } \hat{\psi} = \arcsin\left(\frac{\hat{x}_P}{\hat{d}}\right) \tag{45}$$

where $h_0$ is the human's height. According to equations 44 and 45, the prior knowledge we need for computing distance, height and yaw angle are $l_f^0$, $d_0$ and $L_0$, which can be easily measured.

Therefore, we do not need to calibrate the camera. The assumptions about the camera are that the focal lengths in $X_c$ and $Y_c$ directions are equal and the optical center of the camera is the center of the image. Note that the estimated measurements from vision can be relatively inaccurate compared to the measurements from a 3D localization system. The inaccuracy first comes from the poor quality of the video stream. Since the camera is an analog camera, the video stream includes noise. The inaccuracy also comes from the face tracking algorithm. The face region determined by the KLT tracking may not be exactly covering the human face, so the face center position $[i_P, j_P]^T$ and face length if contain some errors. These issues can be compensated by well designed feedback controllers for the blimp flight.

Human Following Control: Blimps have dynamics that are different from quad-rotors and small airplanes. The general model of blimp has six degrees of freedom and is highly nonlinear and coupled. Based on the self-stabilized physical design of the MAB, the roll angular velocity and the pitch angular velocity are negligible during the blimp flight. The blimp dynamics can be described by three simplified motion primitives:

1. Distance. The blimp can change distance along the horizontal direction that is aligned with its propellers.

$$m\ddot{d} = F_z + f_z \tag{46}$$

where d is the relative distance between blimp and human, fz is the force generated by the two horizontal propellers and $F_z$ is the external forces in $Z_C$ direction.

2. Height. The blimp can ascend or descend to a desired height.

$$m\ddot{h} = F_y + f_y \tag{47}$$

where h is the height of blimp with respect to the ground, fy is the force generated by the two vertical propellers and Fy is the external forces in $Y_C$ direction.

3. Yaw angle. The blimp is able to spin in place so that its yaw angle can be stabilized at any desired value.

$$I\ddot{\psi} = M + \tau. \tag{48}$$

where $\psi$ is the yaw angle, $\tau$ is the torque generated by the propellers and M is the external moments exerted on the blimp.

The external terms $F_z$, $F_y$ and M are disturbances for the blimp and cannot be ignored. To compensate these disturbances, we introduce three feedback controllers to achieve stable blimp flight based on the estimation computed by equation 45. The distance controller uses the estimated distance d as feedback measurement and $f_z$ as control command. The height controller uses the estimated height h as feedback measurement and $f_y$ as control command. The heading controller uses the estimated yaw angle $\psi$ as feedback and $\tau$ as the control command. The goal is to control the blimp so that it keeps a constant distance $d_0$ away from the human at all times, in conjunction with the human moving, while keeping the human face at the center of the image, i.e. $d'=d_0$, $h=h_0$ and $\psi'=0$.

Because the measurements from a single camera are not accurate, the controllers need to be robust to the errors between estimated position and true position. Besides, since the blimp is required to keep the human face in sight of the camera for the entire time, the controllers need to be carefully designed such that blimp can fly fast enough to follow the motion of the human. That is, the settling time of each controller should be relatively short. Meanwhile, the blimp cannot move too fast as it may scare people. Large overshoot of the controller should be avoided.

The controllers are designed as three PID controllers. The PID parameters are carefully tuned in MATLAB based on the system identification of the MAB such that all the control performance requirements mentioned above can be satisfied.

The PID parameters are shown in the Table 3, below:

TABLE 3

PID CONTROLLER GAINS

| | Controllers | | |
|---|---|---|---|
| | P | I | D |
| Distance | 0.0125 | 0 | 0.0658 |
| Height | 1.3120 | 0.0174 | 1.4704 |
| Yaw | 0.3910 | 0 | 0.3840 |

Figure 15:
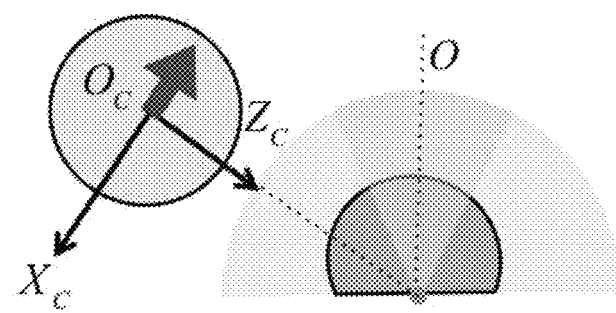
FIG. 15 is a schematic diagram showing relationships in side face detection.

To keep the human face in view of the blimp camera, we also use an on-off controller for the side-way motion to ensure that the MAB is always facing the front of the human. As shown FIG. 15, once the side face is detected, the side-way motion motor will be activated and generate a small force along the XC direction. The force can regulate the blimp to fly back to the front area, facing the front of the human. Once the blimp detects the front face of the human, the side-way motion motor will be turned off.

One embodiment employs a 5.8 GHz analog camera. This compact device weighs 4.5 grams and has diagonal field of view of 115 degrees. The blimp also includes an 8×8 LED matrix display (item 120 in FIG. 1) to provide the visual feedback to humans. The LED display shows the recognition results while the control outputs control the blimp to achieve the spinning and backward motions.

The human communicates his/her intentions to the robot through predefined hand gestures so that human's intentions are regulated and can be predicted. In this experimental embodiment, the human only uses one hand, starts the hand gesture near the human's face and moves it horizontally or vertically. The blimp spins or flies backwards according to these two human hand gestures.

The implementation of human and blimp interaction via hand gestures involves four steps: 1) jointly detecting a human face and hands in real-time video stream, in order to recognize a human; 2) tracking human hand motion and recognizing the hand gestures to understand the human's intentions; 3) using vision-based estimation to control the movement of blimp according to human's hand gestures; and 4) communicating the blimp's intentions to human through the LED display installed on the blimp.

Joint Detection of Face and Hand: The system uses deep learning to detect human face and hands at the same time for each video frame. One embodiment employs Single Shot MultiBox Detector (SSD) SSD reframes object detection as a single regression problem straight from image pixels to a bounding box with a confidence score representing how likely this bounding box tightly contains a specific object. To train an SSD, the learning algorithm discretizes a training image into S×S grid cells. Each cell has B default bounding boxes with different locations and sizes. At training time, these default boxes are matched to the ground truth boxes and compute the confidence score for each object category. A neural network is trained to determine which default boxes have the highest confidence score corresponding to a ground truth detection. At detection time, the trained neural network can directly generate the bounding box with the highest confidence score and determine which category the bounded object belongs to.

To train our neural network specifically for joint detection of human face and hand, we use the image dataset by Oxford Vision Group to produce our own training set. This dataset has already been labeled with human's hands in all images. However, the training images do not label out the human face. So we first assign the originally labeled hand region in each training image as category 1. Then we use the Haar face detector to detect human face in each training image from this dataset and label the region within the face bounding box as category 2. We divide the relabeled image dataset into a training set, which contains 4069 images, and a test set, which contains 821 images. The joint face and hand detector is then trained using images from the training set. We fine tune the resulting neural network using Stochastic Gradient Descent (SGD) with 0.9 momentum, 0.0005 weight decay, and batch size 128. As for the learning rate. We use the $4\times10^4$ for the first $5\times10^4$ iterations, then continue training for $3\times10^4$ iterations with $4\times10^5$ learning rate and another $2\times10^4$ iterations with $4\times10^6$ learning rate.

We evaluate our trained joint detector on the test set using the mean Average Precision (mAP), a common metric used in feature and object detection. Specifically, for each bounding box generated by the trained detector, we discard the box if it has less than k percent Intersection Over Union (IOU) with the ground truth bounding box, which belongs to the same category as the generated box. Given a specific threshold k, we compute the Average Precision (AP) for each test image. Then we compute the mAP by taking the mean of all APs among the entire test images. The test results are that with k=25%, the detector can achieve 0.862 mAP, with k=50%, the detector can achieve 0.844 mAP and with k=75%, the detector can achieve 0.684 mAP.

After training and testing the joint face and hand detector, we use the detector to detect human face and hand in the real-time video stream from the blimp camera.

Hand Gesture Recognition: Once the gesture recognition algorithm is initialized, the algorithm tries to identify two types of hand movements: horizontal linear hand movement and vertical linear hand movement. Because the blimp is controlled by well-designed station-keeping feedback controller, we can assume the blimp is at a fixed 3D location with respect to the human. This enables us to directly track the hand trajectories in the image frame and recognize human's gesture without motion estimation and motion cancellation.

The algorithm detects human hand From frame to frame and tracks the hand's position. Once the gesture recognition is triggered, the hand position is not restricted by the gesture initial region. The human hand can move out of the initial region and still be recognized. We collect the hand position data ill 50 successive video frames once gesture recognition is triggered. The hand trajectory can then be simply modeled as a set of lO points $X-[x_1, \ldots, x_i, \ldots, x_{il}]\epsilon R^{x\tau2}$ in the $X_I$-$0_I$-$Y_I$ image coordinate, where $Xi=[i_i,j_i]\epsilon R.^2$ is a 2D vector of the hand position and n−50. If the human performs a defined gesture to the blimp, the distribution of hand trajectory data X should be close to a line. We utilize Principal Component Analysis (PCA) to analyze the linearity of the set of data points X and determine whether a hand trajectory is a valid hand gesture as we define. PCA is an orthogonal linear transformation that transforms the data set X to a new coordinate system such that the greatest variance of the data lies on the first coordinate, and the second greatest variance on the second coordinate. In this case, the direction of the first coordinate from PCA is exactly the hand gesture direction.

Since the hand positions are in unit of pixel s, the data points ill X do not have zero mean. We need to compute the mean-subtracted data set X'=[xi, ..., ..., X~]T first, $$\mu = \frac{1}{n}\sum_{i=1}^{n} x_i, \; x_i' = x_i - \mu. \tag{49}$$

Then the principle component can be obtained using Singular Value Decomposition (SVD) to decompose the mean-subtracted data set X', $$X'=USV^T, \tag{50}$$

where U is an n×n orthonormal matrix, V is a 2×2 orthonormal matrix and S=diag($\lambda_1$, $\lambda_2$) is an n×2 rectangular diagonal matrix with $\lambda_1 > \lambda_2$. After applying SVD, we obtain the two bases of the new coordinate of PCA, VI and v 2, which are the two column vectors of matrix V. Since $\lambda_1 > \lambda_2$, the distribution of data points can be approximated by projecting all points to the line of VI (passing through shifted origin) with a small approximation error.

We first use the ratio $\lambda_1 > \lambda_2$ to determine whether a hand trajectory is linear. A large ratio represents high linearity. But since no human can move the hand to perform a perfect straight line, we also need to add in some tolerance. It is important to select a threshold for the ratio to recognize a linear hand trajectory. To achieve high hand gesture recognition accuracy and robustness, we run multiple trials using the blimp camera to collect both valid and invalid hand trajectories and finally select the threshold to be 5. Additionally, to avoid false detection of human hand gesture, we also require the maximal first principle component along all hand position data to be greater or equal to 250 (in pixels) so that the hand movement is significant as a human can recognize. That is to say, if $\lambda_1 > \lambda_2 \Sigma = 5$ and $\max_x x^T_i v_i \geq 250$, the hand trajectory is detected as a linear hand gesture. For a linear hand gesture, the slope of the first coordinate $v_1$ is used to determine the direction of hand gesture using the following rules:

If $$\left|\frac{v_{1,2}}{v_{1,1}}\right| \leq 1,$$

the gesture is a horizontal gesture.

If $$\left|\frac{v_{1,2}}{v_{1,1}}\right| \geq 10,$$

the gesture is a vertical gesture.

Otherwise, the hand gesture is invalid, where V1,1 and V1,2 are the first and second elements of vector VI.

Blimp Feedback Control: Due to the unique stable design and the autopilot controller, the MAB can be easily controlled to keep its position at a static location or fly certain pallerned motions. Currently, there are three types of blimp controllers that we design for HRI application:

I) Station Keeping Controller: In order to accurately track human's hand trajectory, we need the blimp to keep a static station with respect to human. The control goal is to control the blimp to keep a fixed distance do away from the human and keep the human face at the center of each video frame. The controller uses the human face position p-[$i_p,j_p$]$^T$, the face length $I_f$ (the length of the face bounding box) in unit of pixel and a prior knowledge of human's true face length $L_0$ in unit of meter, to estimate the 3D human face position [$X_p,Y_p,Z_p$]$^T$ in camera coordinate $$Z_P = f\frac{L_0}{l_f}, \; X_P = \frac{L_0(i_p - i_0)}{l_f}, \; Y_P = \frac{L_0(j_p - j_0)}{l_f}$$

where f is the focal length of the blimp camera and [$i_0,j_0$]$^T$ is the optical center of the camera. Based on the 3D human face position [$X_p,Y_p,Z_p$]$^T$, the relative distance between the blimp and human d, height difference of the blimp and human h and heading angle ψ the blimp with respect to the human, can be calculated $$d = \sqrt{X_P^2 + Z_P^2}, \; h = Y_P, \; \psi = \arcsin\left(\frac{X_P}{d}\right). \tag{50}$$

We use three independent PID controllers to achieve the station keeping task. A distance PID controller to control the relative distance d to coverage to a desired distance do. A height PID controller to control the height difference h to be O. And a heading PI) controller to control the blimp's yaw angle to be 0 degree.

If a valid hand gesture is recognized, the blimp should follow the human's command and take a corresponding motion. At this time, the blimp should no longer keep its static position. In our HRI design, we define two blimp motions corresponding to the hand gesture command. If a vertical gesture is detected, the blimp flies backwards and moves away from the human. If a horizontal gesture is detected, the blimp spins 360 degrees at the initial position. The two motions are controlled by two blimp motion controllers.

Blimp Motion Controllers: Once a vertical gesture is recognized, the distance PID controller is disabled and switches to a backward motion controller, which linearly increases the thrust of the two vertical propellers on the blimp until the thrust reaches to a desired set point. Under this controller, the blimp flies backwards (away from the human). Meanwhile, the height controller and the heading controller are still activated in order to keep the human in the sight of blimp and we keep estimating the relative distance between the human and the blimp using the human face. Once the relative distance reaches to 1.5 meters, the backward motion is completed. The controller switches back to the station keeping controller and the blimp flies towards the human until it reaches the initial interaction distance $d_0$.

Once a horizontal gesture is recognized, all three PID feedback controllers are disabled and a spinning motion controller is activated. The controller gives the two vertical propellers two opposite thrusts so that the blimp can start to spin. The spinning controller is only activated for 2.5 seconds. Although the spinning controller is disabled after 2.5 seconds, the blimp keeps the spinning motion because of its inertia. If the blimp spins back to its initial heading direction, the human face appears in the video frame again. Once the human face is detected again, the spinning motion is completed and the controller switches back to the station keeping controller.

Visual Feedback: Implementing the above three steps, we can theoretically achieve a bi-directional human and blimp interaction. The blimp can understand the human's command through hand gestures and the human can see the blimp's reaction through its corresponding motions. However, through our preliminary experiments, we find out only by implementing the above three steps, the interaction can be unsatisfying for the human user. This is because there is a time delay between the time instant when the blimp detects a human and the time instant when the blimp takes a corresponding movement. Although the time delay is not significant (only several seconds), a human user may be confused without immediate reactions from the blimp. As a result, the human user may redo the hand gesture, approach the blimp to see if there is anything wrong with it or may simply be disappointed and walks away, even if the blimp actually correctly recognizes the hand gesture and performs a correct motion later.

Therefore, it can be useful for the blimp to show the human its intentions. In order to achieve a bi-directional communication between the human user and the blimp, we install a LED matrix screen on the MAB and displays what the blimp is "thinking." The LED screen gives the human an instantaneous feedback during the interaction process and tells the human what is the status of the blimp, whether it detects the user and understands his/her hand gesture. The close interaction distance of the blimp enables the human to see the visual feedbacks from the LED display and such visual feedback helps the human user to take correct actions for the next step and makes the interaction more natural.

Based on the interaction process we introduced above, the system employs four patterns on the LED display to represent four intentions of the blimp. The first pattern, which is the letter "R" indicates that the user's face has been detected the MAD is ready to detect human's hands. The second pattern, which is a "check" mark shown indicates that the blimp has successfully detected a human face and a hand in the gesture initial region, and it is recognizing the human's gesture. The third pattern, which is a "X" indicates that no hand has been detected in the gesture initial region or the blimp cannot recognize a valid hand gesture. The fourth pattern, which is a "/" indicates that the MAB recognizes the human's hand gesture and it is going to react to the human's gesture through the corresponding movement. When seeing this pattern, the human can see if the blimp successfully understands the gesture by checking whether the blimp is taking the correct motion. Once the blimp finishes the motion and comes back to the initial position, it runs the joint detector to detect the human face. If a face is detected, the pattern "R" will be displayed again and the human can perform the next hand gesture and the whole interaction procedure repeats.

This invention can be useful in any application in which a blimp is used in confined spaces, such as inspections of storage tanks and the like. Also, because it is inherently save around humans, it can be used for robotic human interaction, such as in retail stores to direct customers to the location of products.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A blimp, comprising:
   (a) a circular disk-shaped envelope filled with a lighter-than-air gas, the envelope having a circular cross section when intersecting a horizontal plane;
   (b) a gondola affixed to an underside of the envelope and disposed at a region directly below a center point of the envelope, the gondola including:
      (i) a horizontally-disposed elongated circuit board that functions as a structural member of the gondola; and
      (ii) a vertical member extending upwardly from the circuit board and having a top that is attached to the underside of the envelope;
   (c) a thrusting mechanism affixed to the gondola and configured to generate thrust;
   (d) an electronics suite disposed on and electrically coupled to the circuit board and including a blimp processor configured to generate control signals that control the thrusting mechanism; and
   (e) a battery affixed to the gondola and configured to provide power to the electronics suite and the thrusting mechanism.

2. The blimp of claim 1, wherein the thrusting mechanism comprises:
   (a) two spaced apart forward horizontal thrusters, each attached at opposite ends of the circuit board and each controlled by the control circuitry and each configured to generate thrust along an X axis relative to the blimp, each of the forward horizontal thrusters electrically coupled to the circuit board;
   (b) two spaced apart vertical thrusters, each coupled to the vertical member and each controlled by the control circuitry and configured to generate thrust along a Z axis that is orthogonal to the X axis; and
   (c) one side thruster coupled to the vertical member and configured to generate thrust along a Y axis that is orthogonal to the X axis and the Y axis.

3. The blimp of claim 1, further comprising:
   (a) a blimp wireless communication chipset electrically coupled to the electronic circuit board and in data communication with the processor; and
   (b) a ground-based control station, including:
      (i) a ground wireless communication chipset in data communication with the blimp wireless communication chipset; and (ii) a ground processor in data communication with the ground wireless communication chipset, the processor programmed to receive sensory data from the blimp wireless communication chipset via the ground wireless communication chipset, process the sensory data and generate control data that is transmitted to the blimp wireless communication chipset via the ground wireless communication chipset.

4. The blimp of claim 3, further comprising a monocular camera disposed on the gondola and configured to capture video from a region in front of the blimp.

5. The blimp of claim 4, wherein the ground processor is configured to execute a training session in which a specific user stands in front of the blimp and the ground processor detects facial features of the specific user from video data received from the blimp and stores data corresponding to the facial features.

6. The blimp of claim 5, wherein the ground processor is further configured to:
 (a) detect movement of at least one of the facial features of the specific user; and
 (b) generate a control signal that is transmitted to the blimp that causes the blimp to follow the user so as to move to a predetermined distance and orientation from the at least one of the facial features of the specific user.

7. The blimp of claim 5, wherein the ground processor is further configured to:
 (a) detect at least one hand gesture made by the specific user; and
 (b) generate a control signal that is transmitted to the blimp that causes at least one of the thrusters to take a specified action when the hand gesture is detected.

8. The blimp of claim 5, further comprising a feedback element in data communication with the blimp processor and configured to generate user-perceptible feedback to the specific user.

9. The blimp of claim 8, wherein the feedback element comprises a display element affixed to a forward portion of the blimp and configured to generate visually perceptible feedback to the specific user.

10. The blimp of claim 9, wherein the display element comprises an array of light emitting diodes.

11. An autonomous blimp, comprising:
 (a) a circular disk-shaped envelope filled with a lighter-than-air gas, the envelope having a circular cross section when intersecting a horizontal plane;
 (b) a gondola affixed to an underside of the envelope and disposed at a region directly below a center point of the envelope:
  (i) a horizontally-disposed elongated circuit board that functions as a structural member of the gondola;
  (ii) a vertical member extending upwardly from the circuit board and having a top that is attached to the underside of the envelope;
  (iii) two spaced apart forward horizontal thrusters, each attached at opposite ends of the circuit board and each controlled by the control circuitry and each configured to generate thrust along an X axis relative to the blimp, each of the forward horizontal thrusters electrically coupled to the circuit board;
  (iv) two spaced apart vertical thrusters, each coupled to the vertical member and each controlled by the control circuitry and configured to generate thrust along a Z axis that is orthogonal to the X axis; and
  (v) one side thruster coupled to the vertical member and configured to generate thrust along a Y axis that is orthogonal to the X axis and the Y axis;
 (c) an electronics suite disposed on and electrically coupled to the circuit board and including a blimp processor configured to generate control signals that control rotational speed of the horizontal thrusters, the vertical thrusters and the side thruster;
 (d) a battery affixed to the gondola and configured to provide power to the electronics suit, the horizontal thrusters, the vertical thrusters and the side thruster; and
 (e) means for detecting movement of at least one of the facial features of the specific user and to generate a control signal that causes the blimp to follow the user so as to move to a predetermined distance and orientation from the at least one of the facial features of the specific user.

12. The autonomous of claim 11, further comprising:
 (a) a blimp wireless communication chipset electrically coupled to the electronic circuit board and in data communication with the processor;
 (b) a monocular camera disposed on the gondola and configured to capture video from a region in front of the blimp; and
 (c) wherein the means for detecting movement comprises a ground-based control station, including:
  (i) a ground wireless communication chipset in data communication with the blimp wireless communication chipset; and
  (ii) a ground processor in data communication with the ground wireless communication chipset, the processor programmed to receive sensory data from the blimp wireless communication chipset via the ground wireless communication chipset, process the sensory data and generate control data that is transmitted to the blimp wireless communication chipset via the ground wireless communication chipset.

13. The autonomous of claim 12, wherein the ground processor is configured to execute a training session in which a specific user stands in front of the blimp and the ground processor detects facial features of the specific user from video data received from the blimp and stores data corresponding to the facial features.

14. The autonomous of claim 13, wherein the ground processor is further configured to:
 (a) detect at least one hand gesture made by the specific user; and
 (b) generate a control signal that is transmitted to the blimp that causes at least one of the thrusters to take a specified action when the hand gesture is detected.

15. The autonomous of claim 13, further comprising a feedback element in data communication with the blimp processor and configured to generate user-perceptible feedback to the specific user.

16. The autonomous of claim 15, wherein the feedback element comprises a display element affixed to a forward portion of the blimp and configured to generate visually perceptible feedback to the specific user.

17. The autonomous of claim 16, wherein the display element comprises an array of light emitting diodes.

18. An autonomous robotic blimp, comprising:
 (a) a circular disk-shaped envelope filled with a lighter-than-air gas, the envelope having a circular cross section when intersecting a horizontal plane;
 (b) a gondola affixed to an underside of the envelope and disposed at a region directly below a center point of the envelope;
 (c) a five-thruster thrusting mechanism affixed to the gondola and configured to generate thrust;

(d) an electronics suite disposed on the gondola, the electronics suite including:
  (i) a monocular camera disposed on the gondola and configured to capture video from a region in front of the blimp; and
  (ii) a blimp processor that is responsive to the monocular camera and that generates a thrusting mechanism control signal based on the video captured by the monocular cameras;
(e) a battery affixed to the gondola and configured to provide power to the electronics suit, the horizontal thrusters, the vertical thrusters and the side thruster;
(f) a blimp wireless communication chipset electrically coupled to the electronics suite
(g) a ground-based control station, including;
(h) a ground wireless communication chipset in data communication with the blimp wireless communication chipset; and
(i) a ground processor in data communication with the ground wireless communication chipset, the processor programmed to receive sensory data from the blimp wireless communication chipset via the ground wireless communication chipset, process the sensory data and generate control data that is transmitted to the blimp wireless communication chipset via the ground wireless communication chipset, wherein the ground processor is configured to execute a training session in which a specific user stands in front of the blimp and the ground processor detects facial features of the specific user from video data received from the blimp and stores data corresponding to the facial features.

19. The autonomous robotic blimp of claim 18, wherein the gondola comprises a vertical member and wherein the five-thruster thrusting mechanism comprises:
  (a) two spaced apart forward horizontal thrusters, each attached at opposite ends of the circuit board and each controlled by the control circuitry and each configured to generate thrust along an X axis relative to the blimp, each of the forward horizontal thrusters electrically coupled to the circuit board;
  (b) two spaced apart vertical thrusters, each coupled to the vertical member and each controlled by the control circuitry and configured to generate thrust along a Z axis that is orthogonal to the X axis; and
  (c) one side thruster coupled to the vertical member and configured to generate thrust along a Y axis that is orthogonal to the X axis and the Y axis.

20. The autonomous robotic blimp of claim 18, wherein the ground processor is further configured to:
  (a) detect at least one hand gesture made by the specific user; and
  (b) generate a control signal that is transmitted to the blimp that causes at least one of the thrusters to take a specified action when the hand gesture is detected.

21. The autonomous robotic blimp of claim 20, further comprising a feedback element in data communication with the blimp processor and configured to generate user-perceptible feedback to the specific user, wherein the feedback element comprises a display element affixed to a forward portion of the blimp and configured to generate visually perceptible feedback to the specific user, and wherein the display element comprises an array of light emitting diodes.

* * * * *